(12) United States Patent
Matsui et al.

(10) Patent No.: US 7,957,101 B2
(45) Date of Patent: Jun. 7, 2011

(54) SUSPENSION HAVING A TRACE BENT PART THAT IS FIXED TO A TONGUE PART AND AN OUTRIGGER PART

(75) Inventors: Hidetoshi Matsui, Shatin (HK); Takashi Honda, Shatin (HK); Yoshimitsu Wada, Shatin (HK)

(73) Assignee: SAE Magnetics (H.K.) Ltd., Shatin (HK)

(*) Notice: Subject to any disclaimer, the term of this patent is extended or adjusted under 35 U.S.C. 154(b) by 765 days.

(21) Appl. No.: 11/688,467

(22) Filed: Mar. 20, 2007

(65) Prior Publication Data

US 2007/0223143 A1 Sep. 27, 2007

(30) Foreign Application Priority Data

Mar. 23, 2006 (JP) .................. 2006-080781

(51) Int. Cl.
*G11B 21/21* (2006.01)
(52) U.S. Cl. ............... 360/245.9; 360/294.3; 29/603.03
(58) Field of Classification Search ............. 360/245.9, 360/245.7, 294.4, 245, 244.1, 294.7, 245.8, 360/264.2, 244.3, 245.2, 245.3; 29/603.03, 29/603.04
See application file for complete search history.

(56) References Cited

U.S. PATENT DOCUMENTS

| | | | |
|---|---|---|---|
| 5,805,381 A * | 9/1998 | Resh | 360/245.5 |
| 5,982,584 A * | 11/1999 | Bennin et al. | 360/245.9 |
| 6,459,548 B1 * | 10/2002 | Shiraishi et al. | 360/245.9 |
| 6,697,228 B1 * | 2/2004 | Mei et al. | 360/245.3 |
| 6,735,051 B2 * | 5/2004 | Zeng et al. | 360/245.7 |
| 7,403,357 B1 * | 7/2008 | Williams | 360/245.9 |
| 2004/0070887 A1 * | 4/2004 | Yao et al. | 360/294.4 |
| 2006/0098347 A1 * | 5/2006 | Yao et al. | 360/294.4 |
| 2006/0193087 A1 * | 8/2006 | Yao et al. | 360/294.4 |
| 2006/0291102 A1 | 12/2006 | Honda | |
| 2007/0002501 A1 | 1/2007 | Honda et al. | |
| 2007/0030601 A1 | 2/2007 | Honda | |
| 2007/0064347 A1 | 3/2007 | Honda | |

FOREIGN PATENT DOCUMENTS

JP 2002-074870 3/2002

OTHER PUBLICATIONS

English language Abstract of JP 2002-074870, Mar. 15, 2002.

* cited by examiner

*Primary Examiner* — Craig A. Renner
*Assistant Examiner* — Tamara Ashford
(74) *Attorney, Agent, or Firm* — Greenblum & Bernstein P.L.C.

(57) ABSTRACT

A suspension is provided for improving reliability in reading/writing of data by improving stiffness in a longitudinal direction of a flexure while realizing low pitch/roll stiffness of a tongue part. The suspension includes: a flexure, including two branched outrigger parts extending to the tip side of the flexure, and a tongue part for mounting a magnetic head slider, located between the outrigger parts and linked to the tip sides of the outrigger parts; a trace formed on the flexure; and a fixed part in which at least a part of a bent part formed in the trace is fixed to the tongue part.

8 Claims, 23 Drawing Sheets

FIG. 8

| | | | CONVENTIONAL EXAMPLE | PRESENT EMBODIMENT |
|---|---|---|---|---|
| Tongue Width | | [mm] | 0.020 | 0.020 |
| Material Thickness | SST | [mm] | 0.010 | 0.010 |
| | Insulator (Base PI) | [mm] | 0.015 | 0.015 |
| | Conductor (Cu) | [mm] | No model (0.005) | No model (0.005) |
| | Cover PI | [mm] | 2.190 | 2.190 |
| Laser Weld Point from Dimple | | [mm] | — | — |
| Outrigger to Dimple | | [mm] | | |
| Gimbal Stiffness | Roll (TE/LE) | [uNm/deg] | 0.671 | 0.673 |
| | Pitch (TE/LE) | [uNm/deg] | 0.603 | 0.606 |
| | Yaw | [uNm/deg] | — | — |
| | Inline | [N/mm] | 34.463 | 42.259 |
| | Lateral | [N/mm] | 1.353 | 1.353 |
| | Peel (Center) | [mN/mm] | 14.169 | 13.527 |
| | Peel (Leading) | [mN/mm] | 24.464 | 25.240 |
| | Peel (Trailing) | [mN/mm] | 7.207 | 6.698 |
| | Peel (Horizontal) | [mN/mm] | 25.646 | 26.625 |

FIG. 11

| | | CONVENTIONAL EXAMPLE | MODEL 1 | MODEL 2 | MODEL 3 | MODEL 4 |
|---|---|---|---|---|---|---|
| Tongue Width | [mm] | 0.020 | 0.020 | 0.020 | 0.020 | 0.020 |
| Material Thickness | SST [mm] | 0.010 | 0.010 | 0.010 | 0.010 | 0.010 |
| | Insulator (Base PI) [mm] | 0.015 | 0.015 | 0.015 | 0.015 | 0.015 |
| | Conductor (Cu) [mm] | No model (0.005) | No model (0.005) | No model (0.005) | No model (0.005) | No model (0.005) |
| | Cover PI [mm] | 2.190 | 2.190 | 2.190 | 2.190 | 2.190 |
| Laser Weld Point from Dimple | [mm] | — | — | — | — | — |
| Outrigger to Dimple | [mm] | | | | | |
| Gimbal Stiffness | Roll [uNm/deg] | 0.626 | 0.605 | 0.673 | 0.682 | 0.681 |
| | Pitch [uNm/deg] | 0.560 | 0.565 | 0.606 | 0.614 | 0.609 |
| | Yaw [uNm/deg] | | | | | |
| | Inline [N/mm] | 35.857 | 39.029 | 42.259 | 43.270 | 43.295 |
| | Lateral [N/mm] | 1.122 | 1.084 | 1.353 | 1.354 | 1.350 |
| | Peel (Center) [mN/mm] | 12.390 | 12.307 | 13.527 | 13.536 | 13.551 |
| | Peel (Leading) [mN/mm] | 23.259 | 23.785 | 25.240 | 25.364 | 25.234 |
| | Peel (Trailing) [mN/mm] | 6.120 | 6.029 | 6.698 | 6.695 | 6.716 |
| | Peel (Horizontal) [mN/mm] | 24.608 | 25.445 | 26.625 | 26.825 | 26.645 |
| Square measure | Contact area at A1 [mm²] | 0.0104 | 0.0104 | 0.0104 | 0.0104 | 0.0104 |
| | Contact area at A2 [mm²] | 0 | 0.0044 | 0.0185 | 0.032 | 0.0306 |
| Contact area ratio (A2/A1) | % | 0.000% | 42.308% | 177.885% | 307.692% | 294.231% |
| Distance d1 | [mm] | None | 0.1089 | 0.1037 | 0.1037 | 0.1037 |
| Tangue distance d2 | | None | 1.6187 | 1.6187 | 1.6187 | 1.6187 |
| Distance ratio (d1/d2) | % | None | 6.728% | 6.406% | 6.406% | 6.406% |

FIG. 15

| | | | MODEL 11 | MODEL 12 | MODEL 13 | MODEL 14 | MODEL 15 | MODEL 16 |
|---|---|---|---|---|---|---|---|---|
| Tongue Width | | [mm] | 0.020 | 0.020 | 0.020 | 0.020 | 0.020 | 0.020 |
| Material Thickness | SST | [mm] | 0.010 | 0.010 | 0.010 | 0.010 | 0.010 | 0.010 |
| | Insulator (Base PI) | [mm] | 0.015 | 0.015 | 0.015 | 0.015 | 0.015 | 0.015 |
| | Conductor (Cu) | [mm] | No model (0.005) | No model (0.005) | No model (0.005) | No model (0.005) | No model (0.005) | No model (0.005) |
| | Cover PI | [mm] | 2.190 | 2.190 | 2.190 | 2.190 | 2.190 | 2.190 |
| Laser Weld Point from Dimple | | [mm] | — | — | — | — | — | — |
| Outrigger to Dimple | | [mm] | | | | | | |
| Gimbal Stiffness | Roll | [uNm/deg] | 0.664 | 0.695 | 0.730 | 0.771 | 0.814 | 0.860 |
| | Pitch | [uNm/deg] | 0.622 | 0.695 | 0.789 | 0.913 | 1.010 | 1.188 |
| | Yaw | [uNm/deg] | | | | | | |
| | Inline | [N/mm] | 42.841 | 46.198 | 48.945 | 50.490 | 52.186 | 52.974 |
| | Lateral | [N/mm] | 1.200 | 1.308 | 1.467 | 1.625 | 1.799 | 1.963 |
| | Peel (Center) | [mN/mm] | 13.712 | 13.854 | 13.977 | 14.057 | 14.069 | 14.126 |
| | Peel (Leading) | [mN/mm] | 24.173 | 25.759 | 27.410 | 28.994 | 30.144 | 31.120 |
| | Peel (Trailing) | [mN/mm] | 7.030 | 7.040 | 7.055 | 7.078 | 7.065 | 7.131 |
| | Peel (Horizontal) | [mN/mm] | 25.364 | 25.759 | 30.811 | | | 41.774 |
| Square measure | Contact area at A1 | [mm²] | 0.0109 | 0.0104 | 0.0104 | 0.0105 | 0.0106 | 0.0106 |
| | Contact area at A2 | [mm²] | 0.0587 | 0.0589 | 0.0579 | 0.0576 | 0.058 | 0.058 |
| Contact area ratio (A2/A1) | | % | 538.532% | 566.346% | 556.731% | 548.571% | 547.170% | 547.170% |
| Distance d1 | | [mm] | -0.0051 | 0.0966 | 0.1983 | 0.3092 | 0.4051 | 0.4921 |
| Tangue distance d2 | | | 1.6187 | 1.6187 | 1.6187 | 1.6187 | 1.6187 | 1.6187 |
| Distance ratio (d1/d2) | | % | -0.315% | 5.968% | 12.251% | 19.102% | 25.026% | 30.401% |

FIG. 18

| | | | MODEL 21 | MODEL 22 | MODEL 23 |
|---|---|---|---|---|---|
| Tongue Width | | [mm] | 0.020 | 0.020 | 0.020 |
| Material Thickness | SST | [mm] | 0.010 | 0.010 | 0.010 |
| | Insulator (Base PI) | [mm] | 0.015 | 0.015 | 0.015 |
| | Conductor (Cu) | [mm] | No model (0.005) | No model (0.005) | No model (0.005) |
| | Cover PI | [mm] | 2.190 | 2.190 | 2.190 |
| Laser Weld Point from Dimple | | [mm] | — | — | — |
| Outrigger to Dimple | | [mm] | | | |
| Gimbal Stiffness | Roll | [uNm/deg] | 0.653 | 0.716 | 0.824 |
| | Pitch | [uNm/deg] | 0.643 | 0.820 | 1.252 |
| | Yaw | [uNm/deg] | — | — | — |
| | Inline | [N/mm] | 43.521 | 49.479 | 53.864 |
| | Lateral | [N/mm] | 1.195 | 1.465 | 1.972 |
| | Peel (Center) | [mN/mm] | 13.720 | 13.994 | 14.189 |
| | Peel (Leading) | [mN/mm] | 24.409 | 27.650 | 31.315 |
| | Peel (Trailing) | [mN/mm] | 7.046 | 27.650 | 7.196 |
| | Peel (Horizontal) | [mN/mm] | 25.780 | 31.473 | 42.985 |
| Square measure | Contact area at A1 | [mm²] | 0.0109 | 0.0104 | 0.0106 |
| | Contact area at A2 | [mm²] | 0.0376 | 0.0283 | 0.013 |
| Contact area ratio (A2/A1) | | % | 344.954% | 272.115% | 122.642 |
| Distance d1 | | [mm] | 0.079 | 0.2116 | 0.5062 |
| Tangue distance d2 | | | 1.6187 | 1.6187 | 1.6187 |
| Distance ratio (d1/d2) | | % | 4.880% | 13.072% | 31.272% |

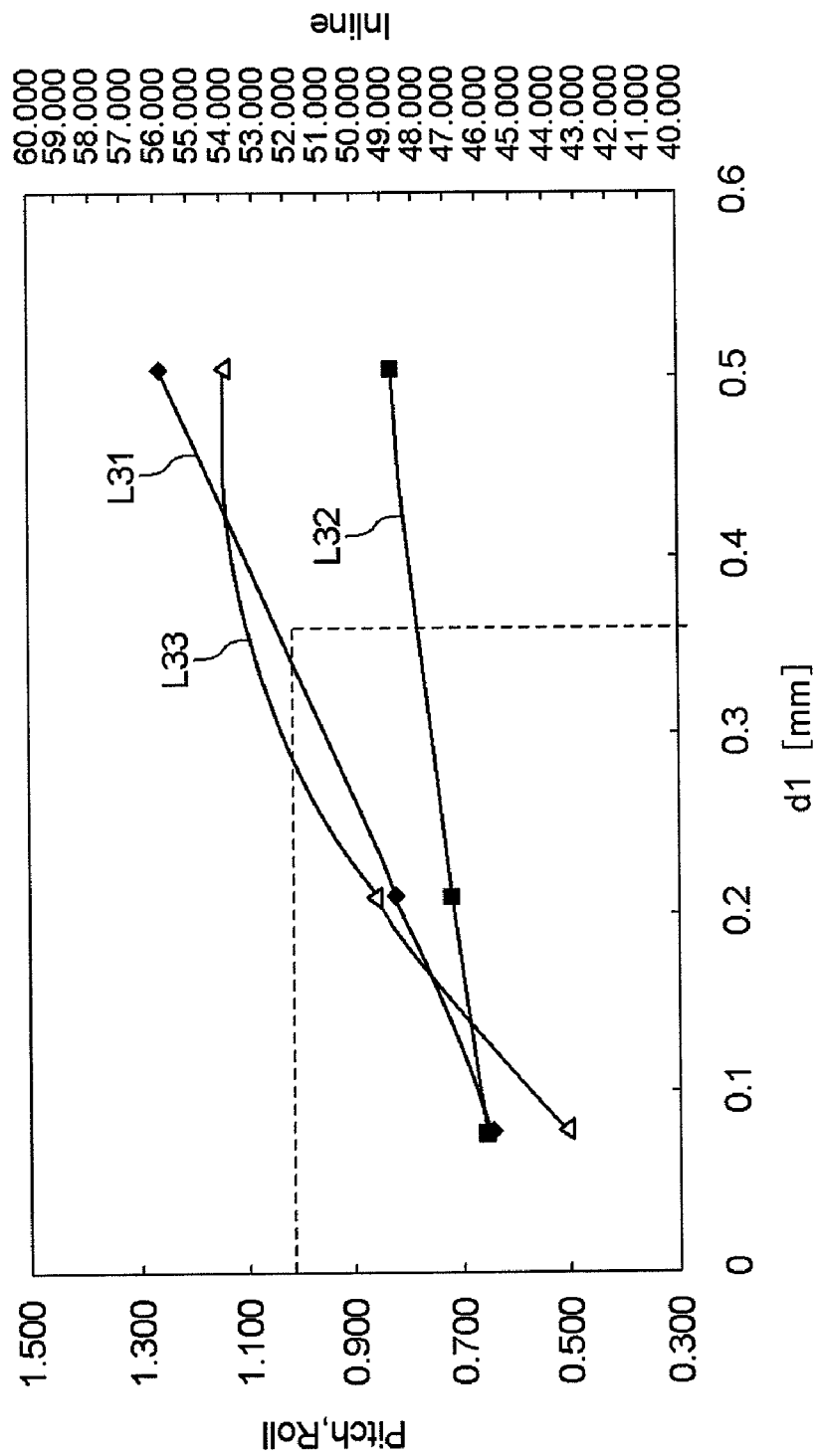

SUSPENSION HAVING A TRACE BENT PART THAT IS FIXED TO A TONGUE PART AND AN OUTRIGGER PART

BACKGROUND OF THE INVENTION

1. Field of the Invention

The present invention relates to a suspension, and in particular, to a suspension on which a magnetic head slider is mounted. Further, the present invention relates to a head gimbal assembly and a disk drive using the suspension.

2. Description of Related Art

A hard disk drive, which is data storage, includes a head gimbal assembly equipped with a magnetic head slider performing read/write of data to a magnetic disk which is a storage medium. FIG. 1 shows a conventional example of a head gimbal assembly 100.

The head gimbal assembly 100 includes: a magnetic head slider 101; a flexure 103 having a spring property equipped with the magnetic head slider 101 on the tip part thereof; an FPC 104 (flexible printed circuit) formed on the flexure 103, which transmits signals to the magnetic head slider 101; and a load beam 105 supporting the flexure. The load beam 105 is mounted on a head arm via a base plate not shown. Further, a plurality of head gimbal assemblies 100 are stacked and fixed to a carriage via respective head arms and pivotally supported so as to be driven rotationally by a voice coil motor to thereby constitute a head stack assembly (not shown).

The head gimbal assembly 100 is driven rotationally by the voice coil motor to thereby position the magnetic head slider 101 mounted on the tip part thereof. In recent years, however, due to an increase in recording density of a magnetic disk, positioning accuracy of a magnetic head provided by such a control is not sufficient.

In order to perform more precise positioning, a microactuator 102 for precisely driving the magnetic head slider 101 is mounted. The microactuator 102 is mounted on the tongue part 133 of the flexure 103. The microactuator 102 is formed in an almost U shape, including two arms which hold the magnetic head slider between them. When the two arms are curbed in right and left, the tip part of the magnetic head slider 101 sways, whereby precise positioning control of the read/write element mounted on the tip part can be performed. Note that the two arms are deformed in a curved manner when the PZT devices provided on the side faces of the arms are driven to be expanded or contracted.

As shown in FIGS. 2 and 3, the flexure 103 includes a flexure body 131 providing the tongue part 133 of the gimbal structure, and a separated part 132 providing flexure side terminals connected with read/write element side terminals of the magnetic head slider 101. They are integrally linked by the FPC 104 as shown in FIGS. 2 and 3. Specifically, the flexure body 131 includes two branched outrigger parts 132 extending to the tips side (part close to the separated part 132), and each of the two outrigger parts 132 is bent inward to be U-shaped near the tip to thereby form a linking part 133a. The outrigger parts 132 are linked to an almost rectangle tongue part 133 interposed between the two outrigger parts 132 at parts ahead of the U-shaped parts.

The flexure 103 is equipped with a trace 104 which applies a voltage to drive PZT devices provided to the arms of the microactuator 102. As shown in FIG. 2, the trace 104 is branched into two, same as the outrigger parts 132, and they are formed along the outrigger parts 132. Each of the branched traces 104 is formed in two paths. One path (reference numeral 141) extends up to the separated part 132 of the flexure 103 so as to be connected with the read/write element side terminals of the magnetic head slider 101, and the other path (reference numeral 142) extends to the actuator side terminal formed near the root of the arm of the microactuator 102. The trace 142 for microactuator is bent to be U-shaped near the tip of the flexure body 131, same as the outrigger part 132, and extends to the back end side of the tongue part 133 and is connected near the back end of the tongue part 133. Alternatively, the trace 142 for microactuator may be formed to extend directly to the connecting terminal for microactuator without passing the tip side, as shown in Japanese Patent Application Laid-Open No. 2002-74870 (Patent Document 1).

On the other hand, as the capacity of a hard disk drive increases in recent years, the recording density of a magnetic disk further increases. In order to cope with it, although a magnetic head slider of a size called pico slider was used in the conventional example described above, a smaller magnetic head slider of a size called femto slider is used. Further, one having a size called pemto slider, which is the size between a pico slider and a femto slider, is also used. In such a case, for the tongue part 133 of the flexure 103 on which such a small magnetic head slider is mounted, low pitch stiffness and low roll stiffness are required. This can be realized by making the plate thickness of the flexure 103 thin, and by making the linking part 133a between the outrigger part 132 and the tongue part 133 narrow.

[Patent Document 1] JP2002-74870A

However, if the pitch stiffness and roll stiffness of the tongue part 133 are lowered by forming the plate thickness of the flexure 103 to be thin, in turn, a problem that the stiffness in a longitudinal direction (see arrow 100 in FIG. 23) of the flexure 103 (hereinafter referred to as "inline stiffness") is lowered is caused. In such a case, if using a CSS drive of the type which causes the magnetic head slider placed on a magnetic disk to fly along with the rotation of the magnetic disk, the magnetic head slider mounted on the tongue part is drawn along with the rotation of the magnetic disk to thereby be stuck to the magnetic disk, causing a problem that prompt and appropriate flying cannot be realized.

If such a problem is caused, a disk drive may not be activated promptly, and further, accurate reading/writing may not be performed to the magnetic disk. Thereby, reliability of the disk drive may be lowered.

SUMMARY OF THE INVENTION

It is therefore an object of the present invention to improve reliability in reading/writing of data by solving the inconveniences involved in the conventional example, and in particular, by improving stiffness in a longitudinal direction of a flexure while realizing low pitch/roll stiffness of a tongue part.

In order to achieve the object, a suspension which is one mode of the present invention is a suspension including: a flexure having two branched outrigger parts extending to the tip side of the flexure, and a tongue part for mounting a magnetic head slider, located between the outrigger parts and linked to the tip sides of the outrigger parts; a trace formed on the flexure; and a fixed part in which at least a part of a bent part formed in the trace is fixed to the tongue part.

According to the invention, at least a part of the bent part in which strength of the trace is high is fixed to the tongue part, so the stiffness in a longitudinal direction of the tongue part (inline stiffness) formed to realize low pitch/roll stiffness is reinforced by the trace.

It is desirable that the position and the area of the fixed part be set such that the pitch stiffness and the roll stiffness of the tongue part become lower than prescribed values, and that the stiffness along a longitudinal direction of the suspension become larger than a prescribed value. Further, it is desirable that the fixed part be not located on a linking part between the outrigger part and the tongue part. Particularly, assuming that the distance from the linking part between the outrigger part and the tongue part to the fixed part is d1, and the length of the tongue part from the linking part is d2, it is more desirable that the position of the fixed part be set to satisfy 0<d1/d2<0.25.

As described above, by setting the position and the fixing area of the fixed part so as to satisfy the pitch stiffness, the roll stiffness and the inline stiffness corresponding to the constituent components such as a magnetic head slider mounted on the tongue part, the shape of the suspension, and the final characteristics of the disk drive, the desired suspension characteristics can be realized. Further, by designing the position of the fixed part so as not to be located on a linking part having a spring property realizing pitch/roll movement of the tongue part, it is possible to secure the spring property of the linking part, to maintain the low pitch/roll stiffness, and to improve the inline stiffness. In particular, by setting the position of the fixed part within the range mentioned above, it is possible to realize more appropriate low pitch/roll stiffness and high inline stiffness.

Further, the trace 4 is fixed to the outrigger part located near the fixed part. Thereby, the stiffness of the trace near to the fixed part is increased, so the inline stiffness of the tongue part can be further improved.

Further, the fixed part is located at each side part of the tongue part facing each outrigger part. Thereby, there is no need to provide the fixed part to a portion where the magnetic head slider and the microactuator are mounted on the tongue part, making design of the suspension easy.

Further, the trace fixed to the tongue part is a trace connected with a microactuator which precisely drives the magnetic head slider mounted on the tongue part. The bent part of the trace constituting the fixed part is a bent part which is folded back toward the connecting pad for microactuator located on the tongue part.

Thereby, the inline stiffness can be enhanced effectively by using the trace to the microactuator mounted on the tongue part, which makes the design easy. Further, the tongue part can be reinforced by the fixed part together with the connecting pad for microactuator, so the inline stiffness can be further improved.

The present invention further provides a head gimbal assembly, including: the suspension described above; a magnetic head slider mounted on the tongue part of the flexure constituting the suspension, and a load beam supporting the flexure. The present invention also provides a head gimbal assembly including a microactuator mounted on the tongue part, which precisely drives the magnetic head slider, in addition to the configuration described above. Further, the present invention also provides a disk drive equipped with the head gimbal assembly. Thereby, it is possible to realize a disk drive having high reliability in data reading and writing.

A method of manufacturing a suspension, which is another embodiment of the present invention, is a method in which a trace is formed on a flexure having two branched outrigger parts extending to the tip side of the flexure, and a tongue part located between the outrigger parts and linked to the tip sides of the outrigger parts. The method includes the step of fixing at least a part of a bent part formed in the trace to the tongue part when forming the trace on the flexure.

A suspension manufactured by the above method also has the same effect as that described above. Therefore, it is possible to improve the inline stiffness while maintaining the low pitch/roll stiffness.

EFFECTS OF THE INVENTION

The present invention is configured and works as described above. With this configuration, at least a part of a bent part in which the strength of the trace is high is fixed to the tongue part, so the stiffness in a longitudinal direction (inline stiffness) of the tongue part formed to realize low pitch/roll stiffness is increased by the trace. Accordingly, the present invention can exhibit an excellent effect of realizing low pitch/roll stiffness of the tongue part while improving the inline stiffness of the suspension, which has not been achieved conventionally.

BRIEF DESCRIPTION OF THE DRAWINGS

FIG. 8 is a table showing simulation results for the characteristics of the suspensions according to the present invention and the conventional example;

FIG. 11 is a table showing simulation results for the characteristics of the suspensions carried out in the second embodiment;

FIG. 15 is a table showing the simulation results for the characteristics of the suspensions carried out in the second embodiment;

FIG. 18 is a table showing the simulation results for the characteristics of the suspensions carried out in the second embodiment;

FIG. 19 is a graph showing the simulation results for the characteristics of the suspension carried out in the second embodiment;

DESCRIPTION OF THE PREFERRED EMBODIMENTS

The present invention is intended to improve stiffness in a longitudinal direction of a flexure, so it is a characteristic of the present invention that the bent parts of a trace are fixed to a tongue part of the flexure. Hereinafter, specific configurations will be described in embodiments. In each embodiment, "attaching" is exemplary used as one mode of "fixing" the flexure and the trace. However, it is not limited to an attached state using an adhesive. Every state where a flexure and a trace contact each other is included.

Embodiment 1

Figure 4:
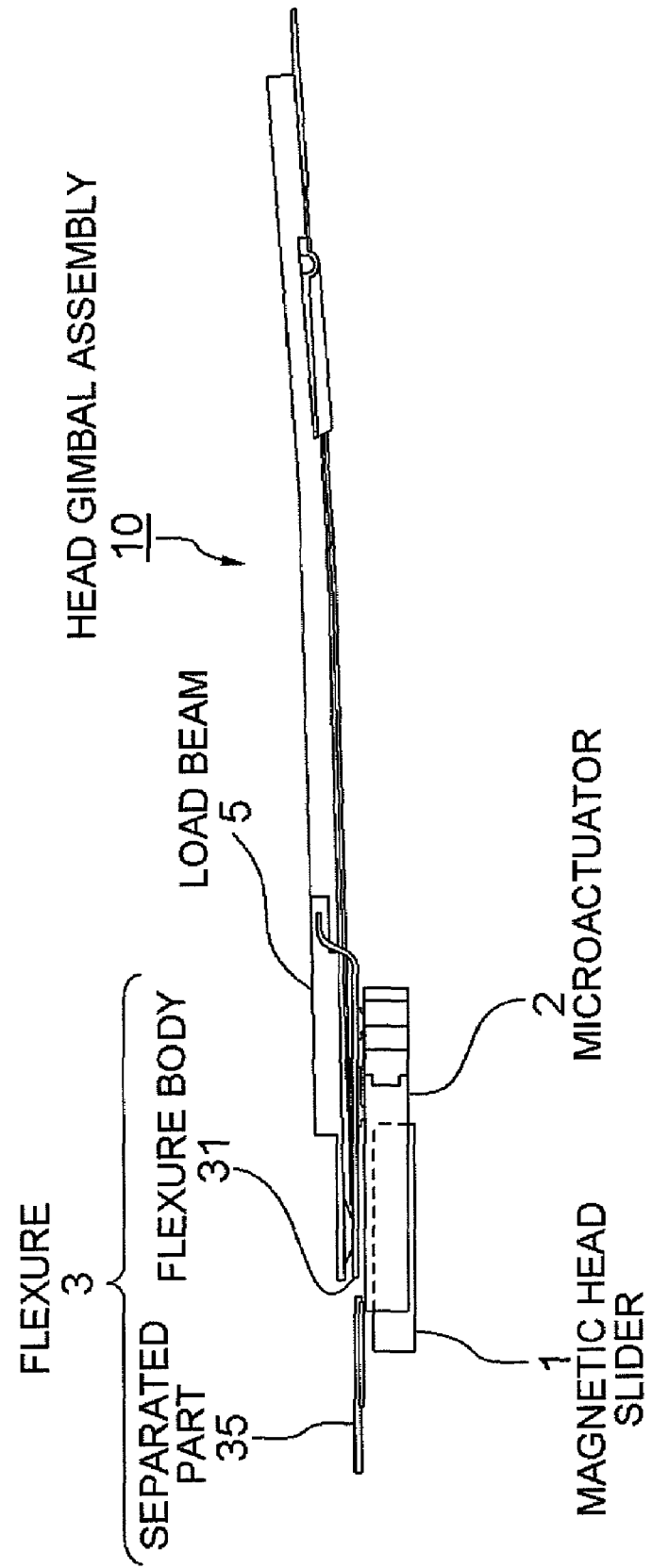
FIG. 4 is a side view showing the configuration of a head gimbal assembly according to the present invention.
Figure 5:
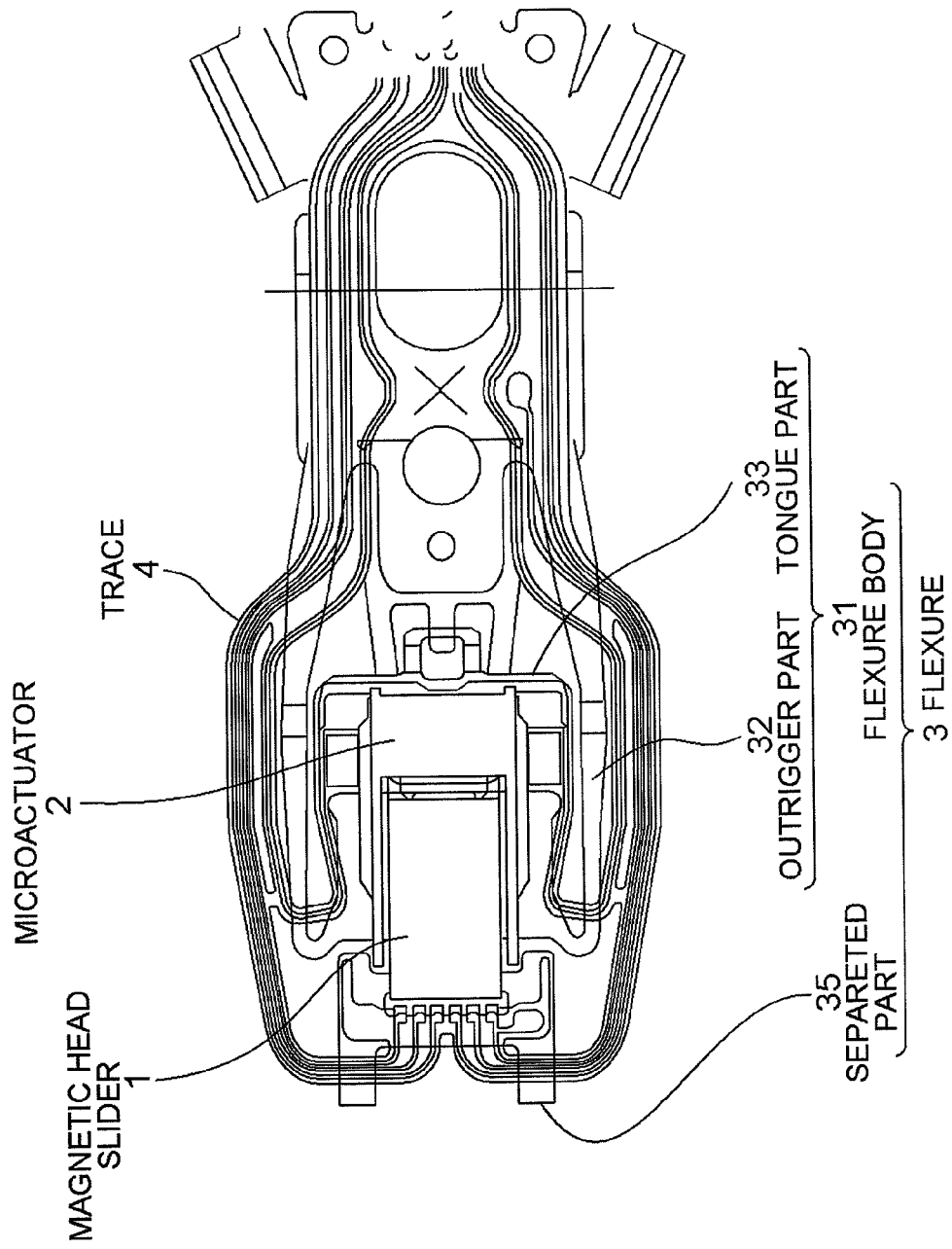
FIG. 5 is a plan view of a head gimbal assembly seen from underneath.
Figure 6:
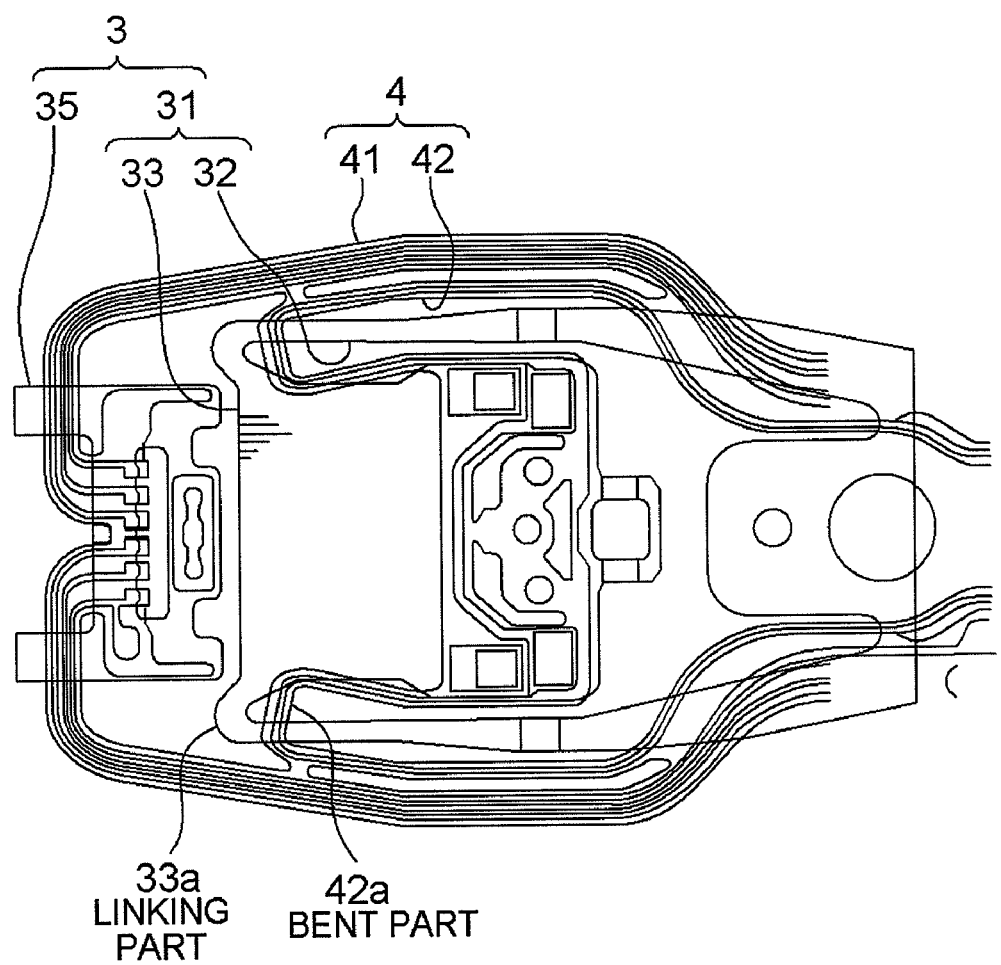
FIG. 6 is an enlarged view showing the configuration of a suspension of the head gimbal assembly disclosed in FIG. 5, in which a magnetic head slider and a microactuator are removed therefrom.
Figure 7:
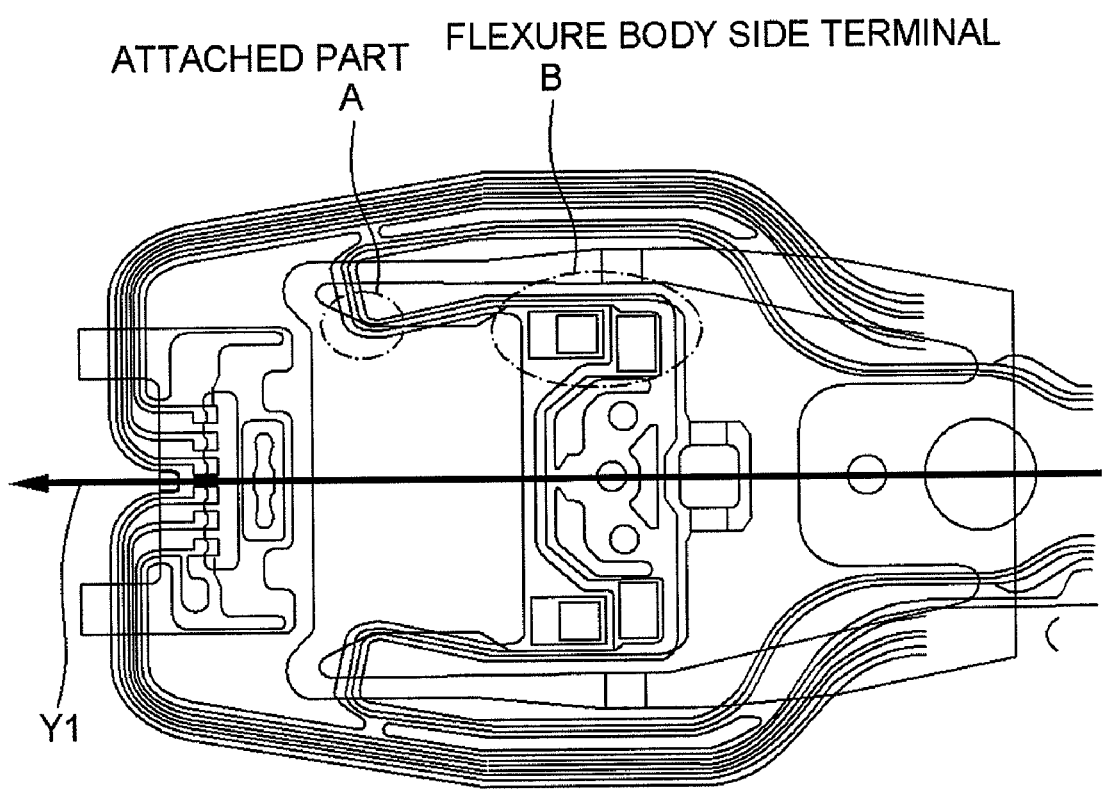
FIG. 7 is a diagram showing the configuration of the suspension disclosed in FIG. 6.

A first embodiment of the present invention will be described with reference to FIGS. 4 to 8. FIGS. 4 and 5 are diagrams showing the configuration of a head gimbal assembly of the present embodiment, and FIGS. 6 and 7 are enlarged views showing the configuration of a flexure and a trace. FIG. 8 shows data indicating the characteristics of the flexure of the present embodiment.
[Configuration]

FIGS. 4 and 5 show an exemplary configuration of a head gimbal assembly 10 to be mounted on a disk drive of the present embodiment. FIG. 4 shows a side view, and FIG. 5 shows a front view of FIG. 4 viewed from underneath (magnetic disk facing face).

As shown in FIGS. 4 and 5, the head gimbal assembly 10 includes: a magnetic head slider 1; a microactuator 2 holding the magnetic head slider 1 between the arms thereof so as to precisely drive the slider 1; a flexure 3 having a spring property, in which the magnetic head slider 1 and the microactuator 2 are mounted on the tip part thereof; a trace 4 (FPC (flexible printed circuit)) which is formed on the flexure 3 and transmits signals to the magnetic head slider 1; and a load beam 5 supporting the flexure 3. The load beam 5 is mounted on a head arm via a base plate not shown, and stacked on and fixed to a carriage via the head arm. In such a state, it is pivotally supported so as to be driven rotationally by a voice coil motor. In the present invention, a configuration including at least the flexure 3 and the trace 4 is called a suspension.

As shown in the enlarged parts of FIGS. 5 and 6, the flexure 3 includes a flexure body 31 fixed to the base plate, and a separated part 35 formed separating from the flexure body 31 and located at the tip side thereof. Specifically, in the flexure body 31, two branched outrigger parts 32 extending to the tip side of the flexure (a part near the separated part 35) are formed, and each of the two outrigger parts 32 is bent inside to be U-shaped near the tip. To the tip of the bent part, a tongue part 33, in an almost rectangle shape, interposed between the two outrigger parts 32 is linked. Therefore, the bent parts of the tip sides of the two outrigger parts 32 constitute linking parts 33a in which they are linked to the tongue part 33, respectively. The linking part 33a provides the tongue part 33 with a spring property, and by forming the plate thickness of the flexure 3 to be thin, low pitch/roll stiffness can be realized. Further, the separated part 35 is disposed with a distance at a further tip side of the flexure body 31, and has flexure side terminals to be connected with read/write element side terminals of the magnetic head slider 1 mounted on the tongue part 33, as described later. The flexure body 31 and the separated part 35 are linked integrally by the trace 4. The trace 4 and the flexure 3 are fixed by the adhesion of a polyimide layer which is an insulating layer of the trace. Note that they may be fixed by using an adhesive or the like.

On the tongue part 33 of the flexure 3, the microactuator 2 which precisely drives the magnetic head slider 1, and the magnetic head slider 1 held by the microactuator 2 are mounted. The microactuator 2 is formed in an almost U shape, including two arms holding the magnetic head slider 1 between them. When the two arms are curved in right and left, the tip part of the magnetic head slider sways. This enables to control precise positioning of the read/write element at the tip part thereof. Note that the two arms are deformed in a curved manner when PZT devices provided on the side faces of the arms are driven to be contracted/expanded. A PZT side terminal for applying a driving voltage to the PZT is formed on the arm root side, that is, on a side face of the PZT at the back end side of the tongue part 33.

The trace 4 is formed to be connected with read/write element side terminals of the magnetic head slider 1 and PZT side terminals of the microactuator 2. More specifically, the trace 4 is branched into two parts same as the outrigger parts 32, and each branched is arranged outside each outrigger part 32. Each branched trace 4 is formed of two paths. One path (reference numeral 41) is formed to extend to the separated part 35 of the flexure 3 so as to be connected with the read/write element side terminals of the magnetic head slider 1 (trace 41 for read/write element). Another path (reference numeral 42) is formed to be bent near the tip of the flexure body 31 and extend to the back end side of the tongue part 33, same as the outrigger part 32, so as to extend to the PZT side terminal formed near the root of the arm of the microactuator 2 (trace 42 for actuator).

The trace 42 for actuator will be explained in more detail. The trace 42 for actuator extends to the tip side along the outrigger part 32 of the flexure 3 on a further outer periphery thereof, and is bent to be U-shaped before the linking part 33a between the outrigger part 32 and the tongue part 33, that is, at the back end side of the linking part 33a to thereby form a bent part 42a. The bent part 42a is in almost U shape, and a part thereof is attached to a side part facing and adjacent to the outrigger part 32 of the tongue part 33. Specifically, the trace 42 for actuator is fixed to the tongue part 33 by the adhesion of polyimide of the lowest layer. Note that in FIG. 7, such a fixed part is shown as an attached part A (fixed part A). The trace 42 for actuator, further extending to the back end side, is separated from the tongue part 33 for a while, but at the back end part of the tongue part 33, it forms a flexure body side terminal to be connected with the PZT side terminal of the microactuator 2 so as to be attached (fixed) to the tongue part 33. Note that in FIG. 7, the flexure body side terminal is shown by the reference mark B.

In the present embodiment, the trace 42 for actuator is attached to the tongue part 33 at two parts, that is, the attached part A and the flexure body side terminal B, as shown in FIG. 7. Particularly, in the attached part A, the bent part 42a having high strength in the trace 42 because it is bent is attached. Therefore, even in the case of making plate thickness of the flexure 2 thin so as to realize low pitch/roll stiffness, the strength of the tongue part 22 is reinforced by the trace 42 for actuator. Therefore, the inline stiffness in a longitudinal direction of the flexure 3 can be improved.

Particularly, the attached part A is not formed on the linking part 33a realizing the spring property of the tongue part 33. Therefore, it is possible to maintain the flexibility of the linking part 33a, to prevent the required low pitch/roll stiffness from being interfered, and to realize low pitch/roll stiffness of the tongue part 33.

Further, as shown in FIG. 7, the trace 42 for actuator is so formed that a portion near to the attached part A runs across the outrigger part 32, and the portion is attached to the outrigger part 32. Accordingly, the stiffness of the trace 42 for actuator is increased near the attached part A, so it is possible to further improve the inline stiffness of the flexure 3.

Further, the trace 42 for actuator to be connected with the microactuator 2 is used, as described above. That is, improvement in the inline stiffness is realized by utilizing the bent part 42 which is a folded-back part positioned at the tip side. Therefore, there is no need to largely change the conventional shape, making the design easy. Further, since the attached part A is formed on the side part facing the outrigger part 32, there is no need to form the attached part A in an area where the magnetic head slider and the microactuator are mounted. This also makes the design of the suspension easy.

Figure 1:
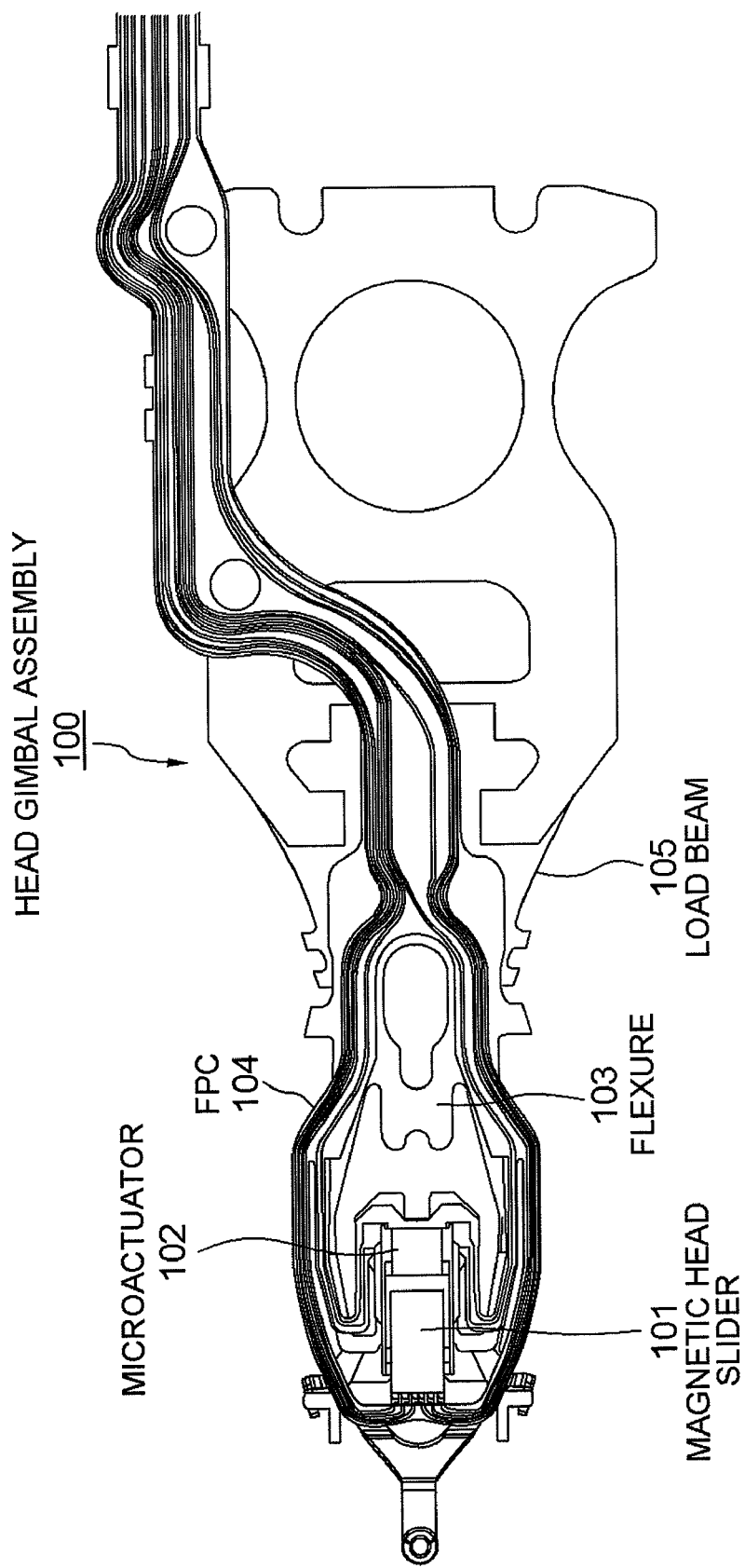
FIG. 1 is a side view showing the configuration of a head gimbal assembly according to a conventional example.
Figure 2:
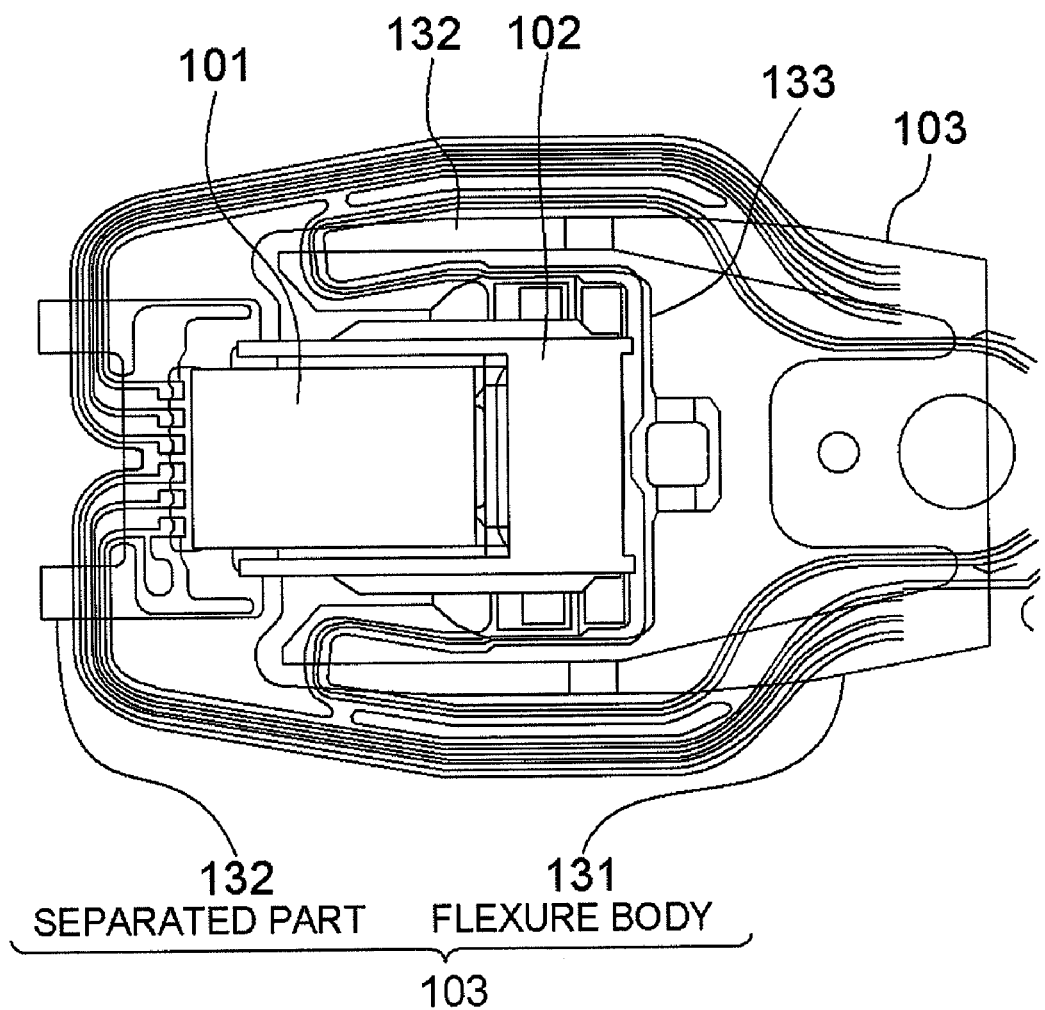
FIG. 2 is an enlarged view showing the tip part of the head gimbal assembly according to the conventional example disclosed in FIG. 1.
Figure 3:
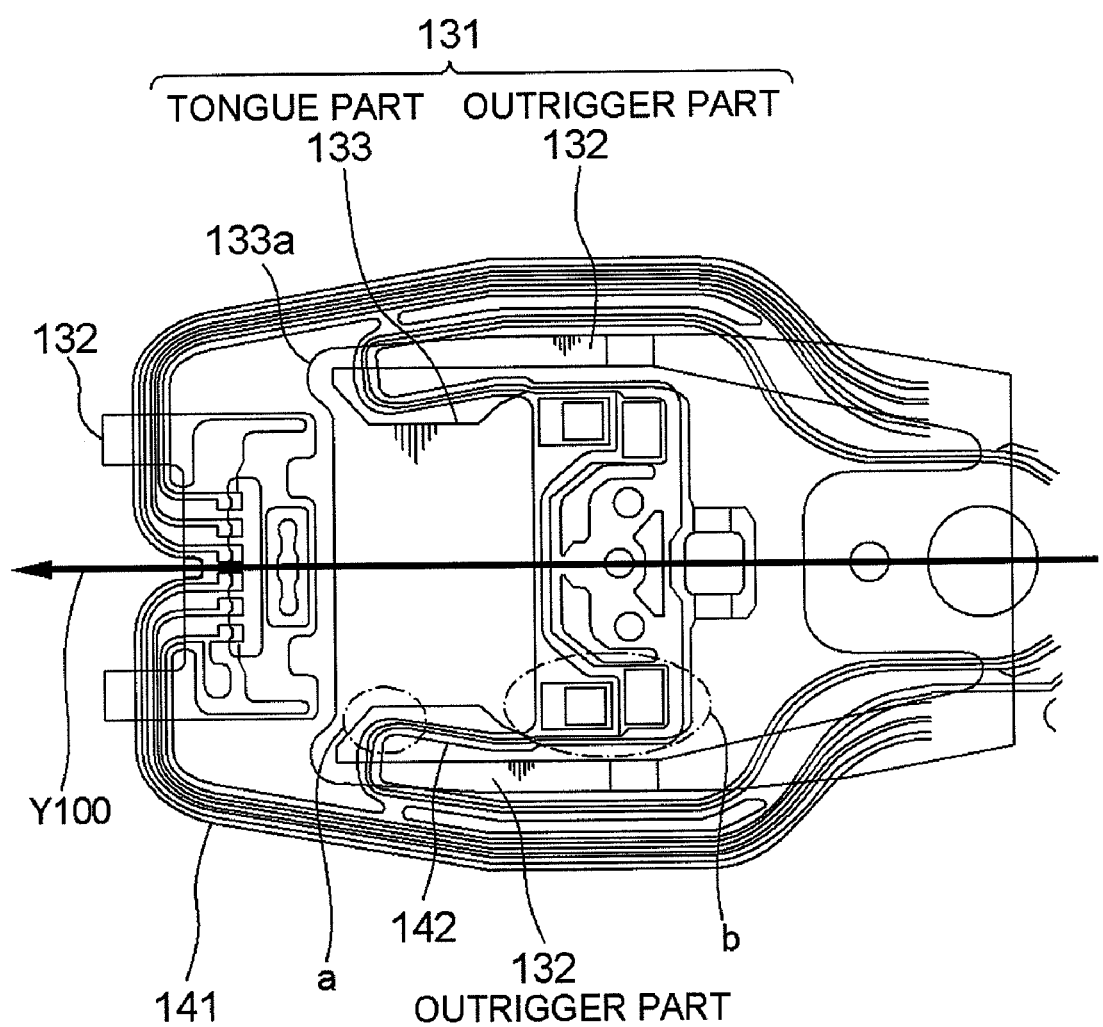
FIG. 3 is an enlarged view showing the configuration of a suspension of the head gimbal assembly in the conventional example disclosed in FIG. 1, in which the magnetic head slider and the microactuator are removed therefrom.

FIG. 8 shows a result of measuring characteristics of the suspension (flexure 3 and trace 4) of the present invention described above and the suspension (flexure 103 and FPC 104) of the conventional example shown in FIGS. 2 and 3 in simulations. As shown in FIG. 3, in the flexure 103 and the tongue part 133 of the conventional example, the trace (FPC 104) forms a flexure body side terminal so as to be connected with the tongue part 133 in the area "b", but it is not connected with the tongue part 133 in the area "a". From this configuration, it is found that although the plate thicknesses (SST) of the flexures 3 and 103 and the thicknesses (Insulator(Base PI), Conductor (Cu), Cover PI) of the traces 4 and 104 are same respectively, the inline stiffness (Inline) in a longitudinal direction of the flexure 3 shown by the arrow Y1 in FIG. 7 is increased in the suspension of the present embodiment, as shown in FIG. 8. In this case, the pitch and roll stiffness (Roll(TE/LE) and Pitch(TE/LE)) of the tongue part 33 can be maintained at a low level, same as the conventional example. As described above, it is obvious from the simulation results that the present invention is capable of improving the inline stiffness while securing low pitch/roll stiffness.

Further, in the present embodiment, the tip side and the back end side of the tongue part 33 are attached to and reinforced by the trace 42 for microactuator by the attached part A and the flexure body side terminal B, so it is possible to improve the inline stiffness effectively with an easy configuration.

Configurations of a suspension mainly include three types. That is, (1) a type in which polyimide and copper constituting the trace 4 are joined to stainless constituting the flexure 3, and etched (TSA (Trace Suspension Assembly)), (2) a type in which a trace material is applied to a required part on the flexure 3 to form a pattern (CIS (Circuit Integrated Suspension), and (3) a type in which an FPC constituting the trace 4 is bonded to the flexure 3 with an adhesive (FSA (FPC Suspension Assembly)). Of course, the present invention includes a case where the flexure 3 and the trace 3 are fixed without an adhesive, like (1) TSA and (2) CIS above. Further, a suspension manufactured by another method is also included.

Embodiment 2

Next, description will be given for simulation results carried out by changing the position and the area of the attached part A (fixed part between the flexure 3 and the trace 4) in the suspensions 3 and 4 having the configuration described above so as to find out appropriate values thereof.

Figure 9A:
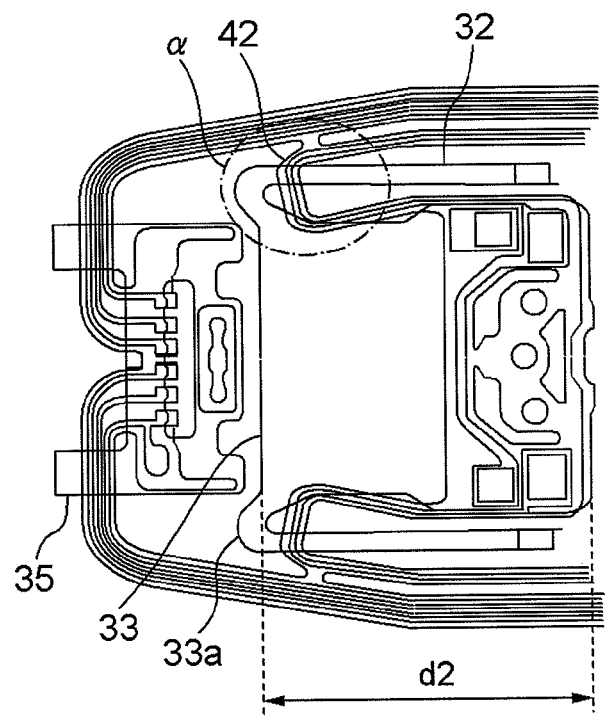
FIG. 9A is a diagram showing the configuration of a suspension used in simulation in a second embodiment.
Figure 9B:
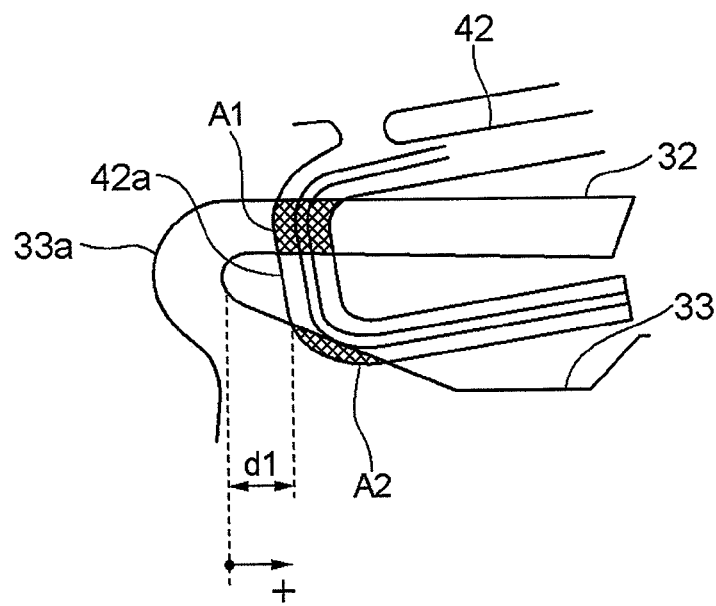
FIG. 9B is an enlarged view of the part denoted by α of the suspension disclosed in FIG. 9A.
Figure 10A:
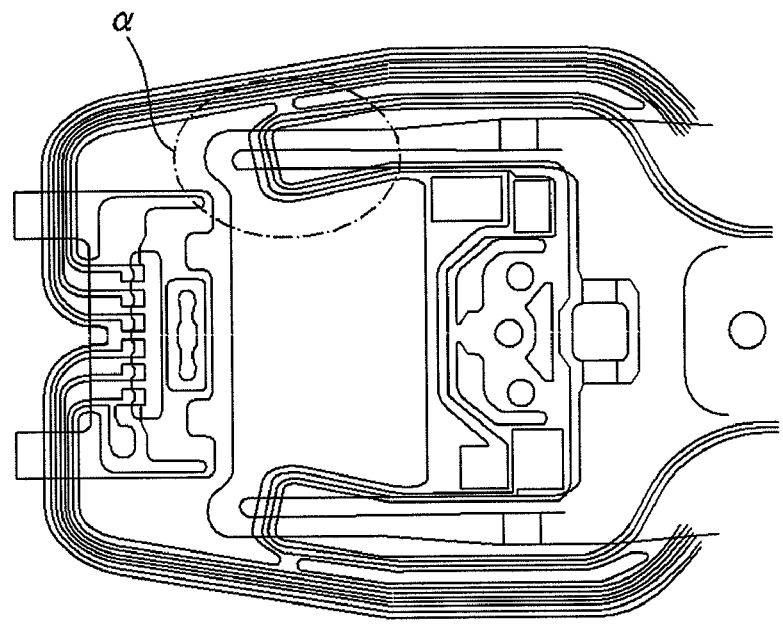
FIG. 10A is a diagram showing another configuration of a suspension used in simulation in the second embodiment.
Figure 10B:
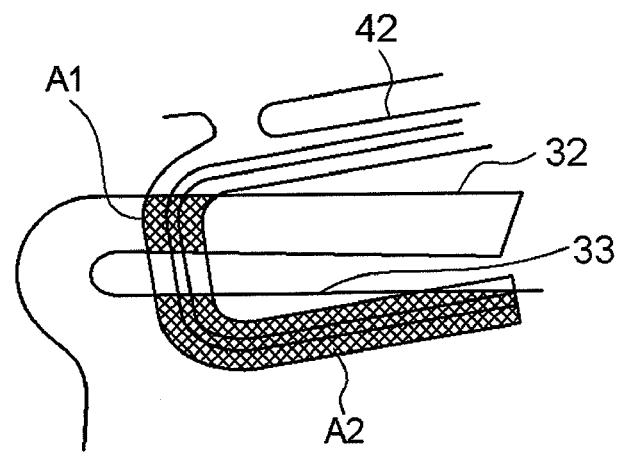
FIG. 10B is an enlarged view of the part denoted by α of the suspension disclosed in FIG. 10A.

First, description will be given with reference to FIGS. 9A to 12. FIGS. 9A, 9B, 10A, and 10B show suspensions 3 and 4 of different shapes designed by changing the attached area between the trace 4 (trace 42 for actuator) and the tongue part B in the attached part A. For convenience, the configuration shown in FIG. 9A is referred to as a model 1, and the configuration shown in FIG. 10A is referred to as a model 3. FIGS. 9A and 10A show plan views, and FIGS. 9B and 10B show enlarged views of the surrounding part a of the attached part A. Besides them, models 2 and 4 of different shapes were also prepared and simulations were carried out, but the models 2 and 4 are not shown.

As shown in FIGS. 9A, 9B, 10A and 10B and the table of FIG. 11, every model of the present invention is so formed that the length d2 of the tongue part 33 from the linking part 33a between the outrigger part 32 and the tongue part 33 is same, and the length d1 from the linking part 33a to the attached part of the bent part 42a of the trace 42 for actuator is almost same. By indicating the attached area between the trace 42 for actuator and the outrigger part 32 with a reference mark A1, and the attached area between the trace 42 for actuator and the tongue part 33 with a reference mark A2, the attached area A1 with the outrigger part 32 is same in every model, but the attached area A2 with the tongue part 33 is different. In other words, the area A2 of the attached parts A is formed to be larger in the order of the model 1, the model 2, the model 4 and the model 3. On the other hand, the attached part A is not formed in the model of the conventional example, so the area A2 is 0.

Figure 12:
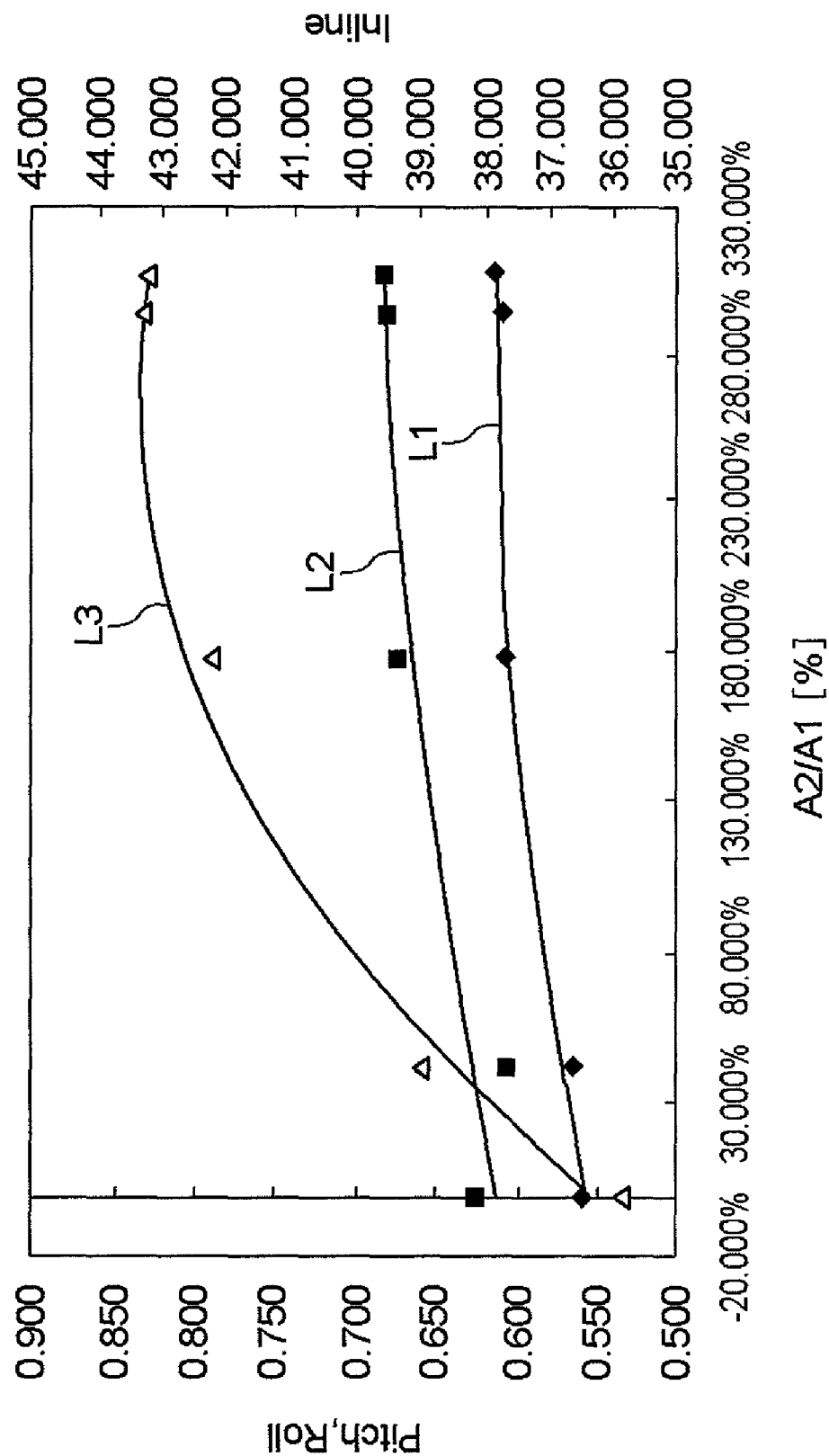
FIG. 12 is a graph showing the simulation results for the characteristics of the suspensions carried out in the second embodiment.

The table of FIG. 11 and the graph of FIG. 12 show results of measuring the pitch/roll stiffness (Roll(TE/LE), Pitch(TE/LE)) of the tongue part 33 and the inline stiffness (Inline) in a longitudinal direction of the flexure 3 in the respective models described above in simulations. In FIG. 12, the pitch stiffness is indicated by the line L1, the roll stiffness is indicated by the line L2, and the inline stiffness is indicated by the line L3.

As shown in FIGS. 11 and 12, in the case of changing the area A2 of the attached part A, it is found that the pitch/roll stiffness and the inline stiffness are increased as the attached area A2 becomes larger. The pitch/roll stiffness in which low stiffness is required has low rate of rise, and in any case, it is not more than 1.0 μNm/deg effective in pico-slider, so it is an allowable value. Accordingly, if the attached area A2 is set to be large, the low pitch/roll stiffness may be damaged, but the effect is low. Therefore, the attached area A2 can be set to be able to achieve desired inline stiffness.

For example, the attached area A1 in the attached part A is increased or decreased by changing the bending level of the bent part 42a of the trace 42 for actuator, or by changing the shape of the tongue part 33. Thereby, the inline stiffness can be adjusted. Alternatively, the attached area A2 can be adjusted similarly by changing the width of the polyimide layer of the trace 42 for actuator near to the attached part A.

Figure 13A:
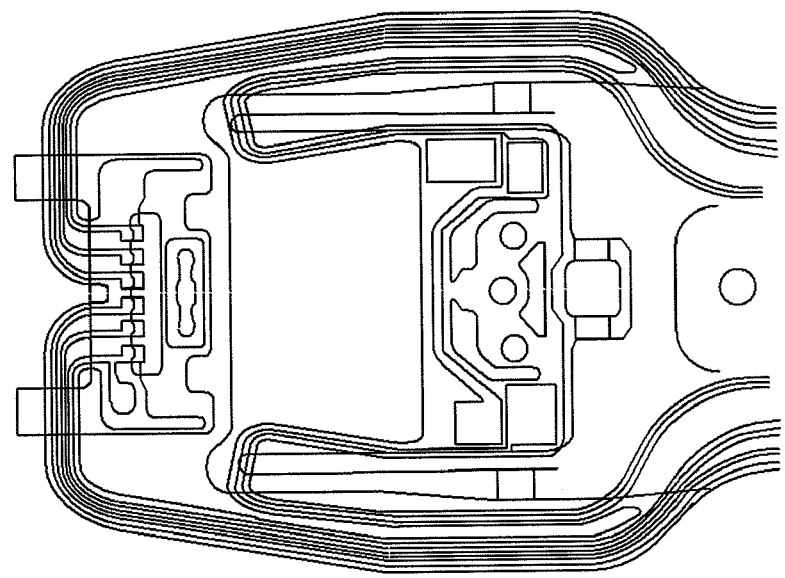
FIG. 13A is a diagram showing the configuration of a suspension used in simulation in the second embodiment.
Figure 13B:
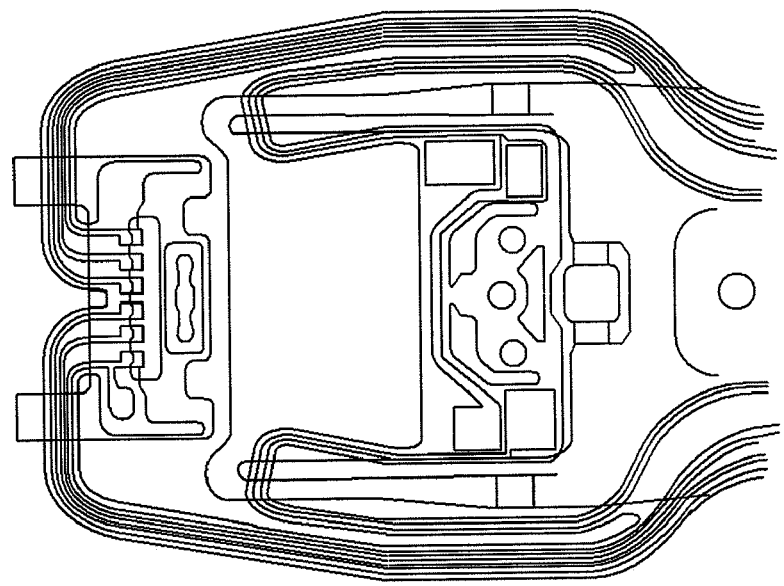
FIG. 13B is a diagram showing the configuration of a suspension used in simulation in the second embodiment.
Figure 14A:
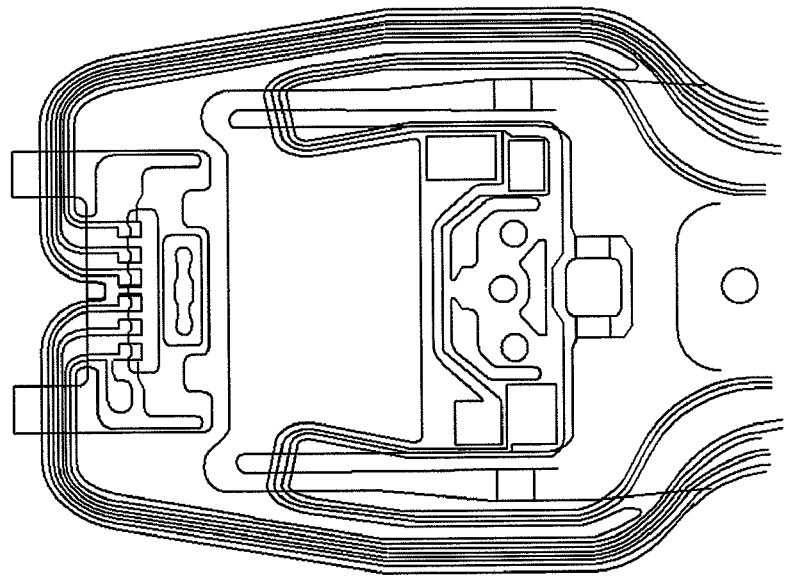
FIG. 14A is a diagram showing the configuration of a suspension used in simulation in the second embodiment.
Figure 14B:
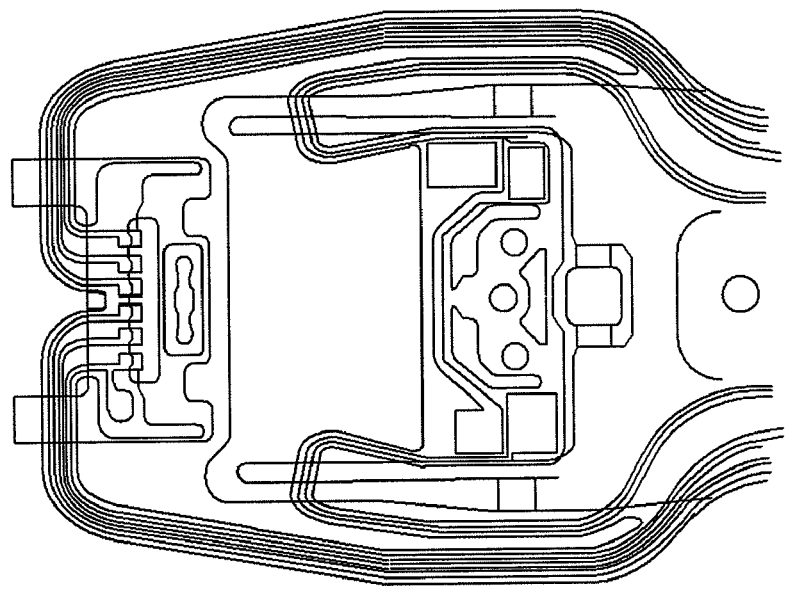
FIG. 14B is a diagram showing the configuration of a suspension used in simulation in the second embodiment.

Next, description will be given with reference to FIGS. 13 to 16. FIGS. 13A, 13B, 14A and 14B show models of the suspensions 3 and 4 having four different shapes in which the position of the attached part A is changed, respectively. FIG. 13A shows a model 11, FIG. 13B shows a model 12, FIG. 14A shows a model 13, and FIG. 14B shows a model 14, and the respective models are so formed that the distance D1 from the linking part 33a to the bent part 42a of the trace 42 for actuator (see FIG. 9B, etc.) becomes larger sequentially. As shown in FIGS. 9A to 10B, the right side in the drawing shows positive (+). In the model 11 (FIG. 13A), the attached part A overlaps the linking part 33a, so the value is negative (−).

Figure 16:
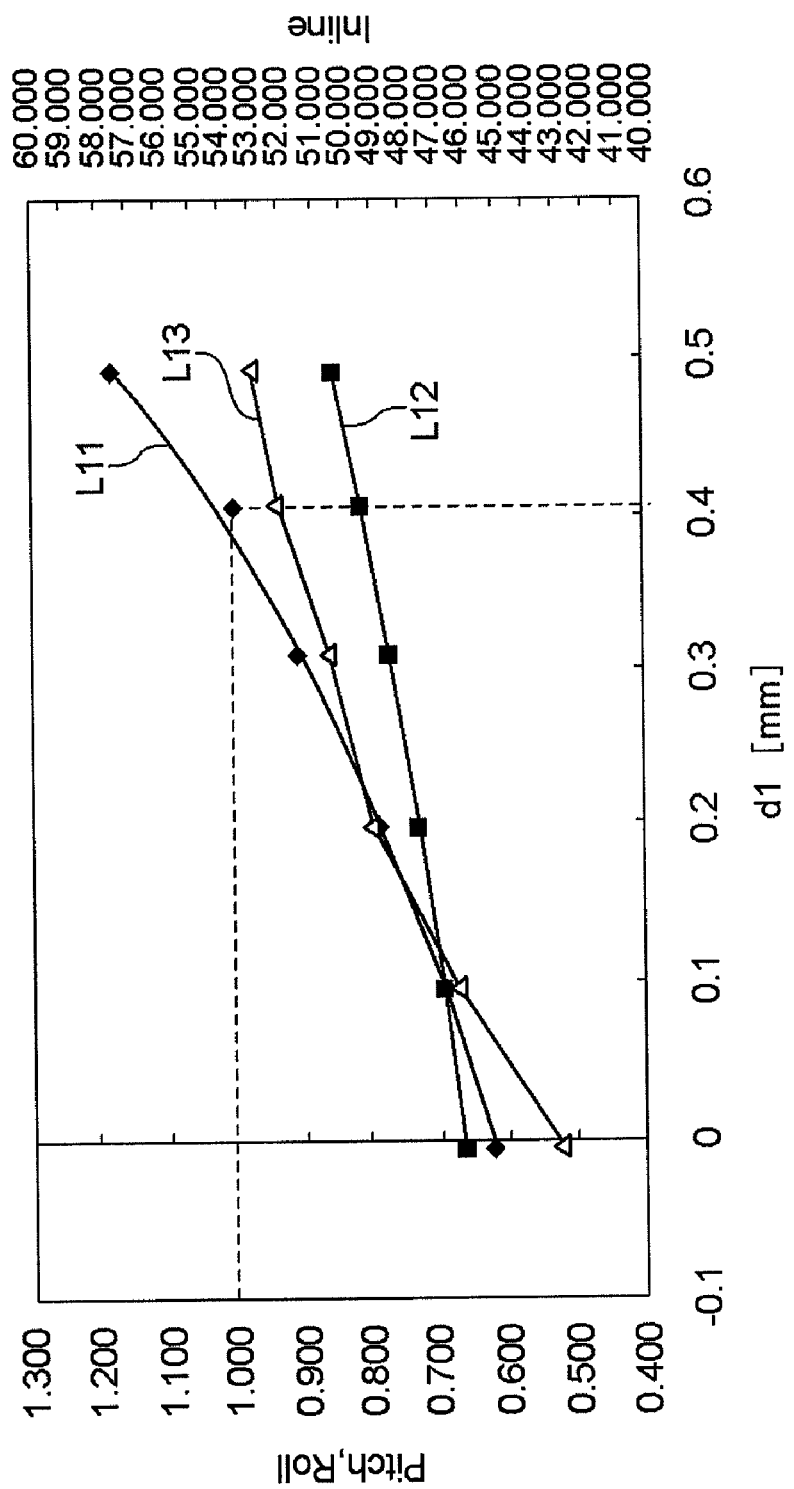
FIG. 16 is a graph showing the simulation results for the characteristics of the suspensions carried out in the second embodiment.

Besides, models 15 and 16 (not shown) in which the position of the attached part A (distance d1) was different were also prepared. The table of FIG. 15 and the graph of FIG. 16 show the results of measuring the pitch/roll stiffness (Roll (TE/LE), Pitch(TE/LE)) of the tongue part 33 and the inline stiffness (Inline) in a longitudinal direction of the flexure 3 of the models. In FIG. 16, the pitch stiffness is indicated by the line L11, the roll stiffness is indicated by the line L12, and the inline stiffness is indicated by the line L13.

As shown in FIGS. 15 and 16, if the position of the attached part A (distance d1) with reference to the linking part 33a is changed, the pitch stiffness, the roll stiffness, and the inline stiffness may be increased as the distance d1 becomes larger. In this case, since the rates of rise of the pitch stiffness and the roll stiffness are high, it is required to obtain inline stiffness of appropriate size while suppressing the pitch/roll stiffness to be low. For example, considering a case of setting the pitch/roll stiffness to not more than 1.0 μNm/deg effective in a pico-slider, the distance d1 becomes the largest value in the model 15. Considering the condition of the distance d1 of this case as a proportion to the length d2 of the tongue part 33, it is found that it is only necessary to satisfy 0<d1/d2<0.25. The reason of setting a condition of larger than 0 is that the attaching part A is desirably not formed on the linking part 33a between the outrigger part 32 and the tongue part 33.

Figure 17A:
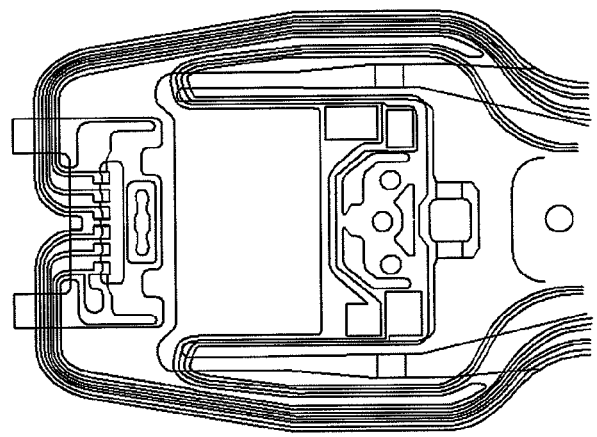
FIG. 17A is a diagram showing the configuration of a suspension used in simulation in the second embodiment.
Figure 17B:
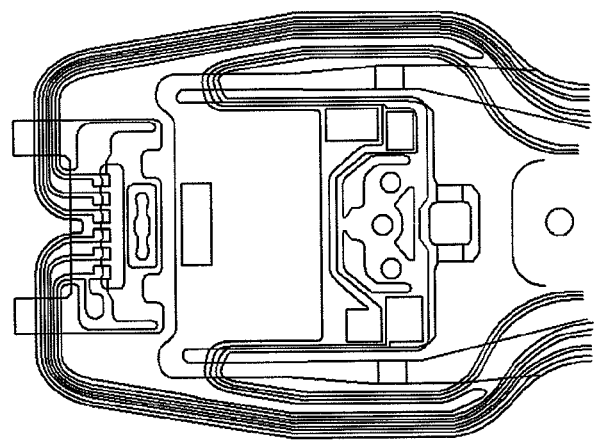
FIG. 17B is a diagram showing the configuration of a suspension used in simulation in the second embodiment.
Figure 17C:
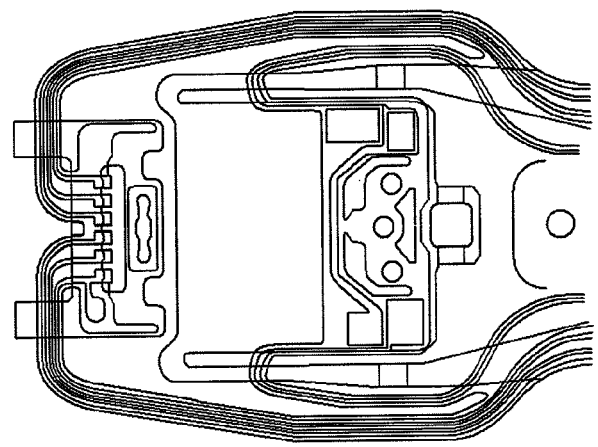
FIG. 17C is a diagram showing the configuration of a suspension used in simulation in the second embodiment.
Figure 20:
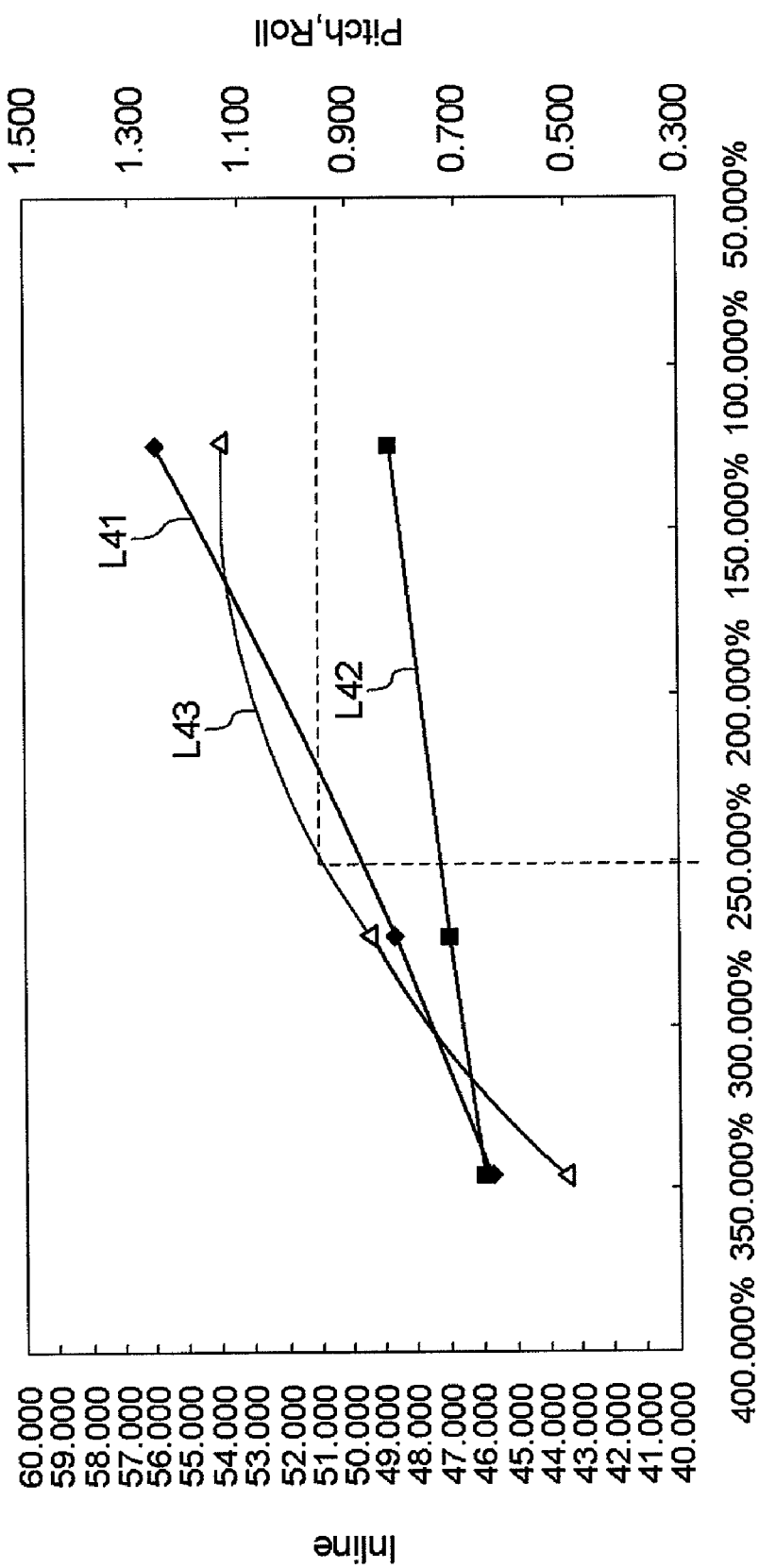
FIG. 20 is a graph showing the simulation result for the characteristics of the suspension carried out in the second embodiment.

Description will be further given with reference to FIGS. 17A to 20. FIGS. 17A, 17B and 17C show plan views of the suspensions 3 and 4 in three different shapes in which the position of the attached part A (distance d1) and the area A1 are changed. Note that FIG. 17A shows a model 21, FIG. 17B shows a model 22, and FIG. 17C shows a model 23, in each of which the distance d1 between the attached part A and the area A2 is set as shown in FIG. 18. The table of FIG. 18 and the graphs of FIGS. 19 and 20 show the results of measuring pitch/roll stiffness (Roll(TE/LE), Pitch(TE/LE)) of the tongue part 33 and the inline stiffness (Inline) in a longitudinal direction of the flexure 3 of each model. In FIG. 19, the horizontal axis shows the distance d1 of the attached part A, the line L31 shows the pitch stiffness, the line L32 shows the roll stiffness, and the line L33 shows the inline stiffness. Further, in FIG. 20, the horizontal axis shows the attached area (actually, area ratio A2/A1) of the attached part A, and the line L41 shows the pitch stiffness, the line L42 shows the roll stiffness, and the line L43 shows the inline stiffness.

As shown in these drawings, if the distance d1 of the attached part from the linking part 33a and the attached area A2 (see FIGS. 9A, 9B, etc.) are changed, lines similar to those shown in FIG. 16 in which the distance d1 of the attached part A is changed are given. In other words, in FIGS. 19 and 20, the models 31, 32 and 33 are plotted in this order from the left, showing the same changes as those of FIG. 16. Thereby, it is understood that there is little effect of changing the attached area A.

From the simulation results described above, considering the case of setting the pitch/roll stiffness to not more than 1.0 μNm/deg for example as described above, it is found that the ratio of the distance d1 of the attached part A to the length d2 of the tongue part 33 is desirably set to 0<d1/d2<0.25.

Embodiment 3

Next, a third embodiment of the present invention will be described with reference to FIGS. 21 and 22. The above embodiments have described a configuration in which a microactuator is mounted on a head gimbal assembly, and the trace 42 for actuator connected with the microactuator is connected with the tongue part 33. In the present embodiment, the trace 4 connected with read/write element side terminals formed on an end face of a magnetic head slider (not shown) is attached (fixed) to the tongue part 33.

Figure 21:
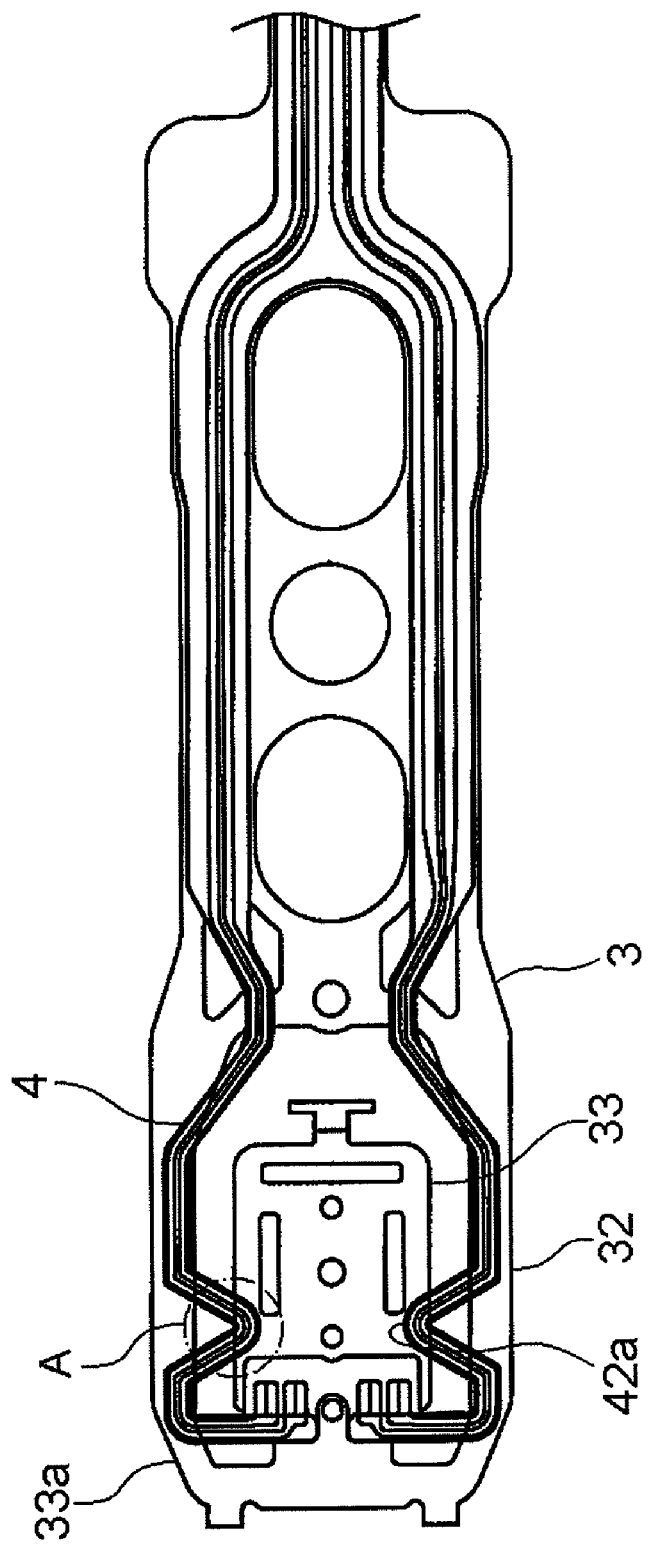
FIG. 21 is a diagram showing the configuration of a suspension according to a third embodiment.

FIG. 21 shows an example thereof. In FIG. 21, the trace 4, extending on the outrigger part 32 from the back end side of the flexure 3 to the read/write element side terminals positioned on the tip side, is bent inward before the tip, and a part of the bent part 42a is attached (fixed) to the side part of the tongue part 33. The trace 4 further extends to the tip side, and is bent toward the tongue part 33 before the linking part 33a, and is attached to a part of the read/write element side terminal of the magnetic head slider, to thereby form a flexure side connecting pad. Even with this configuration, it is possible to maintain the low pitch/roll stiffness of the tongue part 33 same as those described above, and to improve the inline stiffness which is stiffness along the longitudinal direction of the flexure 3, by the attached part A.

Figure 22:
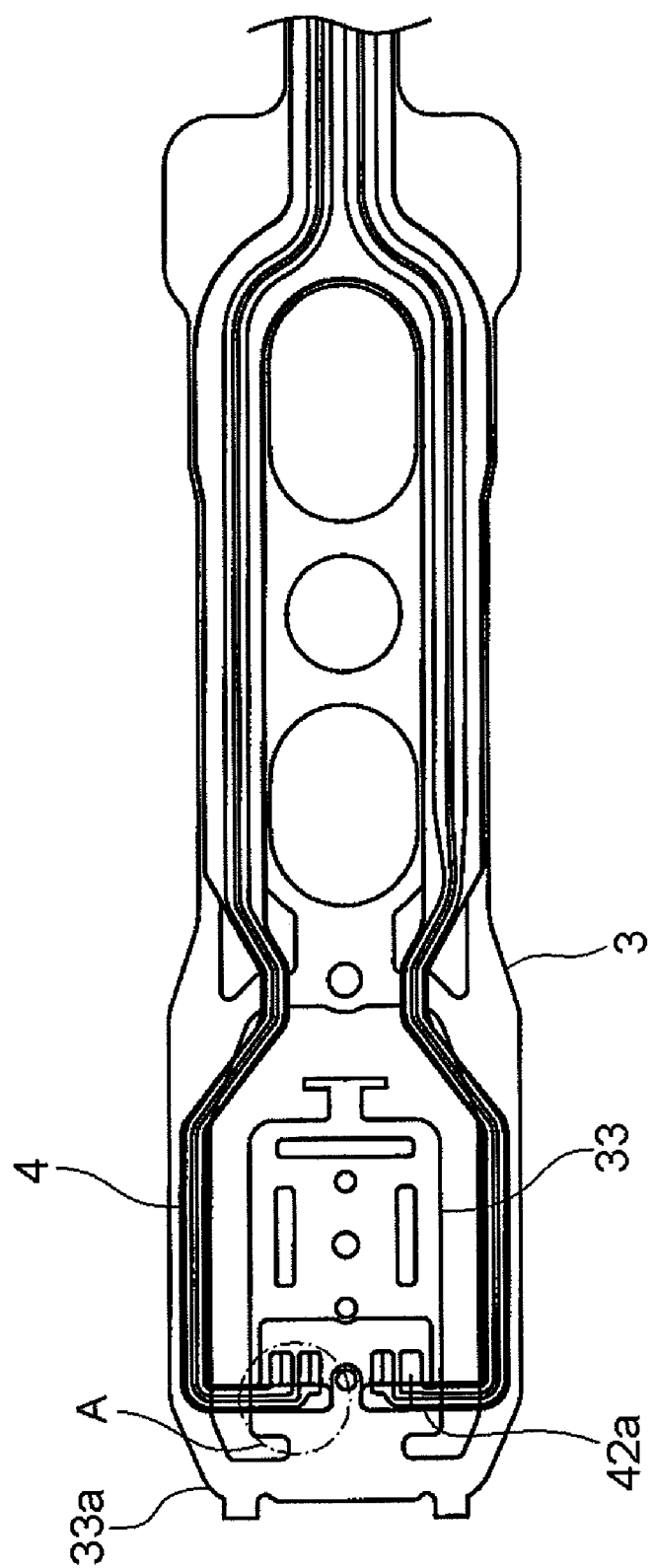
FIG. 22 is a diagram showing another configuration of a suspension according to the third embodiment.

FIG. 22 shows another example. In FIG. 22, the trace 4 extending on the outrigger part 32 from the back end side of the flexure 3 to the read/write element side terminal at the tip side is bent toward the tongue part 33 positioned inside before the linking part 22a, and is attached to a part where the read/write element side terminals of the magnetic head slider mounted on the tongue part 33 are positioned, to thereby form a flexure side connecting pad. The connecting pad forms the bent part 42a of the trace 4, and is attached (fixed) to the side part of the tongue part 33 to thereby form the attached part A, same as that described above. Even with this configuration, it is possible to maintain low pitch/roll stiffness of the tongue part 33 same as those described above, and to improve the inline stiffness which is stiffness along the longitudinal direction of the flexure 3, by the attached part A.

Even in the cases of the two examples described above, it is desirable to form the position of the attached part A to be set in the range explained in the second embodiment. Note that the shape of the suspension described above is just an example, and is not limited to such a shape.

Embodiment 4

Figure 23:
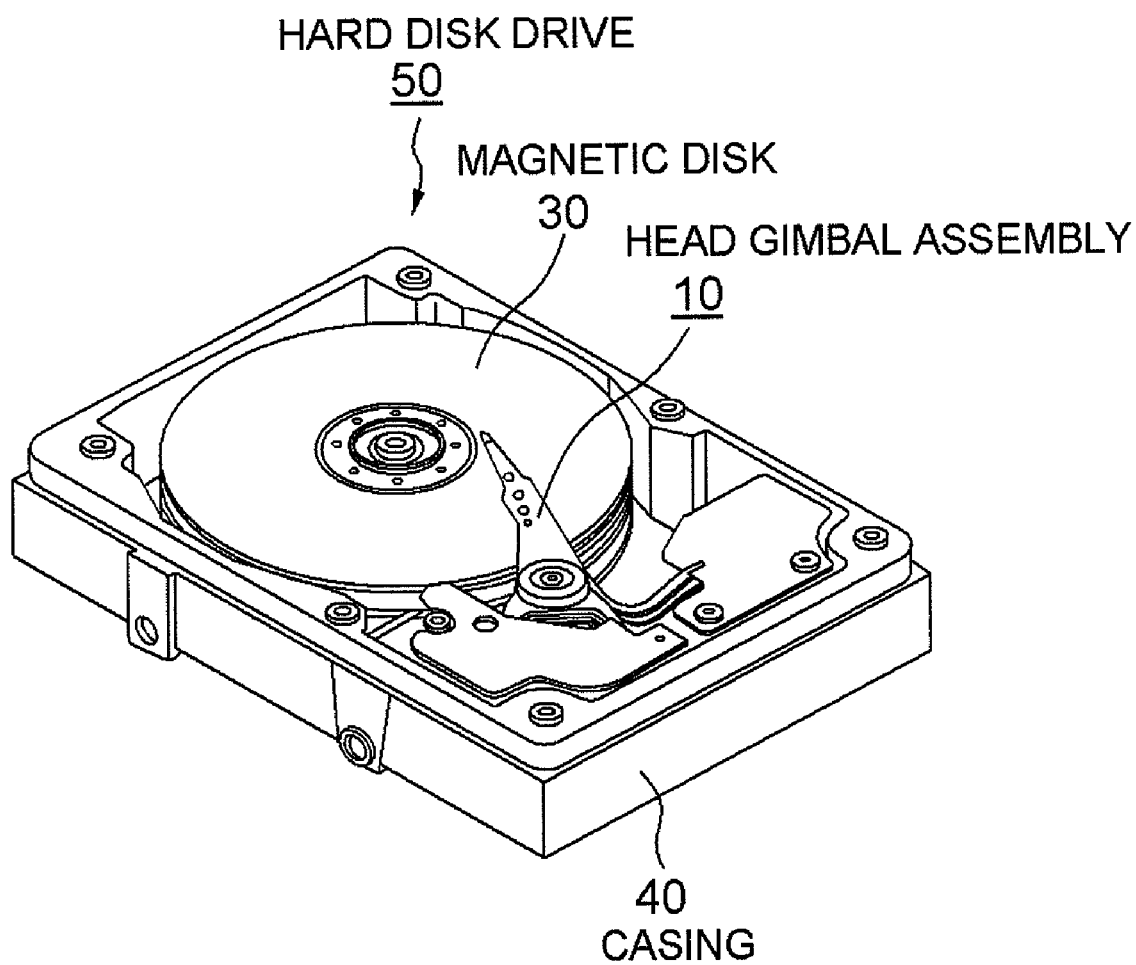
FIG. 23 is a perspective view showing the configuration of a hard disk drive according to a fourth embodiment.

Next, a disk drive according to the present embodiment will be described with reference to FIG. 23. FIG. 23 shows an example in which the head gimbal assembly 10 of the present invention described above is mounted on a hard disk drive 50. As shown in FIG. 23, the hard disk drive 50 includes, in the casing 40 thereof, the head gimbal assembly 10 on which the magnetic head slider 1 for reading/writing data to a magnetic disk 30, or a storage media, is mounted. Note that a plurality of magnetic disks 30 are provided, and a plurality of head gimbal assemblies 10 are provided by being stacked on a carriage corresponding to the respective magnetic disks to thereby constitute a head stack assembly.

In the present embodiment, the magnetic head slider 1 is a drive of CSS type particularly in which it is always positioned above the magnetic disk 30, so when rotation of the magnetic disk 30 is stopped, the magnetic head slider 1 contacts the magnetic disk 30, and when the magnetic disk 30 rotates, the magnetic head slider 1 flies by the air flown into the ABS of the magnetic head slider 1 caused by the rotation.

In this case, the flexure is required to have low pitch/roll stiffness and so formed. However, if the inline stiffness is low as the conventional example, the magnetic head slider mounted on the tongue part is drawn by the rotation of the magnetic disk 30 and stuck to the magnetic disk. However, in the suspension, that is, in the magnetic head slider, of the present invention configured as described above, the inline stiffness can be high. Thereby, the magnetic head slider will not be stuck to the magnetic disk 30, so prompt and appropriate flying can be realized. At the same time, the flexure 3 can also maintain low pitch/roll stiffness, so more appropriate operation can be realized.

INDUSTRIAL APPLICABILITY

The present invention can be used for a disk drive performing read/write of data to a magnetic disk, and has an industrial applicability.

What is claimed is:

1. A suspension, comprising:
   a flexure, including: two branched outrigger parts extending to a tip side of the flexure; and a tongue part for mounting a magnetic head slider, located between the outrigger parts and linked to tip sides of the outrigger parts;
   a trace formed on the flexure;
   a fixed part in which a first part of a bent part formed in the trace is fixed to the tongue part to define the fixed part and a second part of the bent part formed in the trace is fixed to the outrigger part;
   the fixed part is not located on a linking part between the outrigger part and the tongue part, but located at a position wherein a distance from the linking part between the outrigger part and the tongue part to the fixed part is defined as d1, a length of the tongue part from the linking part is defined as d2, and the position of the fixed part is set so as to satisfy a condition $0 < d1/d2 < 0.25$, and
   wherein the second part of the bent part is fixed to the outrigger part at a distance from the linking part that is approximately the same as the distance from the linking part to the fixed part; and
   the trace is separated from the tongue part at a position between the fixed part and a terminal of the trace formed at a back end side of the tongue part, wherein the back end side of the tongue part is provided at an end of the tongue part that is opposite the linking part.

2. The suspension according to claim 1, wherein the fixed part is located at each side part of the tongue part facing each outrigger part.

3. The suspension according to claim 1, wherein the trace fixed to the tongue part is a trace connected with a microactuator which precisely drives the magnetic head slider mounted on the tongue part.

4. The suspension according to claim 1, wherein the first part of the bent part of the trace forming the fixed part is bent toward a connecting pad for a microactuator located on the tongue part.

5. A head gimbal assembly, comprising:
   the suspension according to claim 1;
   a magnetic head slider mounted on the tongue part of the flexure constituting the suspension, and
   a load beam supporting the flexure.

6. A head gimbal assembly, comprising:
   the suspension according to claim 3;
   a magnetic head slider mounted on the tongue part of the flexure constituting the suspension;
   and
   a load beam supporting the flexure.

7. A disk drive comprising the head gimbal assembly according to claim 5.

8. A method of manufacturing a suspension in which a trace is formed on a flexure having two branched outrigger parts extending to a tip side of the flexure and a tongue part located between the outrigger parts and linked to tip sides of the outrigger parts, the method comprising:
   fixing a first part of a bent part formed in the trace to the tongue part when forming the trace on the flexure thereby providing a fixed part,
   fixing a second part of the bent part formed in the trace to the outrigger part;
   locating the fixed part such that the fixed part is not located on a linking part between the outrigger part and the tongue part, but located at a position wherein a distance from the linking part between the outrigger part and the tongue part to the fixed part is defined as d1, a length of the tongue part from the linking part is defined as d2, and positioning the fixed part to satisfy a condition $0 < d1/d2 < 0.25$, and
   fixing the second part of the bent part to the outrigger part at a distance from the linking part that is approximately the same as the distance from the linking part to the fixed part; and,
   separating the trace from the tongue part at a position between the fixed part and a terminal formed at a back end side of the tongue part, wherein the back end side of the tongue part is provided at an end of the tongue part that is opposite the linking part.

* * * * *